US012567066B2

(12) United States Patent
    Kwong et al.

(10) Patent No.: US 12,567,066 B2
(45) Date of Patent: Mar. 3, 2026

(54) MODIFYING CONTROL SCOPES OF CONTROLS ACROSS A PLURALITY OF DATA PROCESSES VIA DATA OBJECTS

(71) Applicant: OneTrust LLC, Atlanta, GA (US)

(72) Inventors: Carman Kwong, Coquitlam (CA); Patrick Glenn Murray, Kula, HI (US); Christopher Cross, Calgary (CA); Taylor Arnett, Calgary (CA)

(73) Assignee: OneTrust, LLC, Atlanta, GA (US)

( * ) Notice: Subject to any disclaimer, the term of this patent is extended or adjusted under 35 U.S.C. 154(b) by 145 days.

(21) Appl. No.: 18/322,307

(22) Filed: May 23, 2023

(65) Prior Publication Data

US 2024/0394700 A1      Nov. 28, 2024

(51) Int. Cl.
| | |
|---|---|
| *G06Q 20/40* | (2012.01) |
| *G06F 3/0482* | (2013.01) |
| *G06F 3/04847* | (2022.01) |
| *H04L 9/40* | (2022.01) |

(52) U.S. Cl.
    CPC ......... *G06Q 20/401* (2013.01); *G06F 3/0482* (2013.01); *G06F 3/04847* (2013.01); *H04L 63/20* (2013.01)

(58) Field of Classification Search
    CPC .... G06Q 20/401; G06Q 10/06; G06Q 10/067; G06F 3/0482; G06F 3/04847; H04L 63/20
    See application file for complete search history.

(56) References Cited

U.S. PATENT DOCUMENTS

| | | | | |
|---|---|---|---|---|
| 11,416,561 | B1 * | 8/2022 | Satish | ................... H04L 63/105 |
| 2019/0050597 | A1 * | 2/2019 | Barday | ................. G06F 16/951 |

* cited by examiner

*Primary Examiner* — Asher D Kells

(74) *Attorney, Agent, or Firm* — Ballard Spahr LLP

(57)                ABSTRACT

Methods, systems, and non-transitory computer readable storage media are disclosed for managing computing systems according to detect and correct configuration gaps with specific system requirements frameworks. Specifically, the disclosed system accesses a digital data repository to determine attribute values of data objects representing functions or infrastructure associated with handling target data for an entity. The disclosed system determines a digital representation of a system requirements framework that indicates controls associated with handling specific data types. Based on the attribute values and a gap rules set associated with the system requirements framework, the disclosed system determines configuration gaps to be addressed via control actions for installing controls in connection with various data assets or data processes. The disclosed system generates tasks to display via a graphical user interface of a computing device for applying modifications to the data assets and/or data processes to address the configuration gaps.

20 Claims, 20 Drawing Sheets

700

Manage Product Scopes

View and manage the product scopes of your organizations controls.

Controls          Custom Controls          702

704

| Control Name | Number of Controls | Control Scope |
|---|---|---|
| AC1 – Access Provisioning and Approval | 4 | Process Specific          Entity-Wide |
| DS5 – Equipment Disposal/Recycling | 1 | Process Specific          Entity-Wide |
| AA2 – Unique IDs and Strong Passwords | 4 | Process Specific          Entity-Wide |

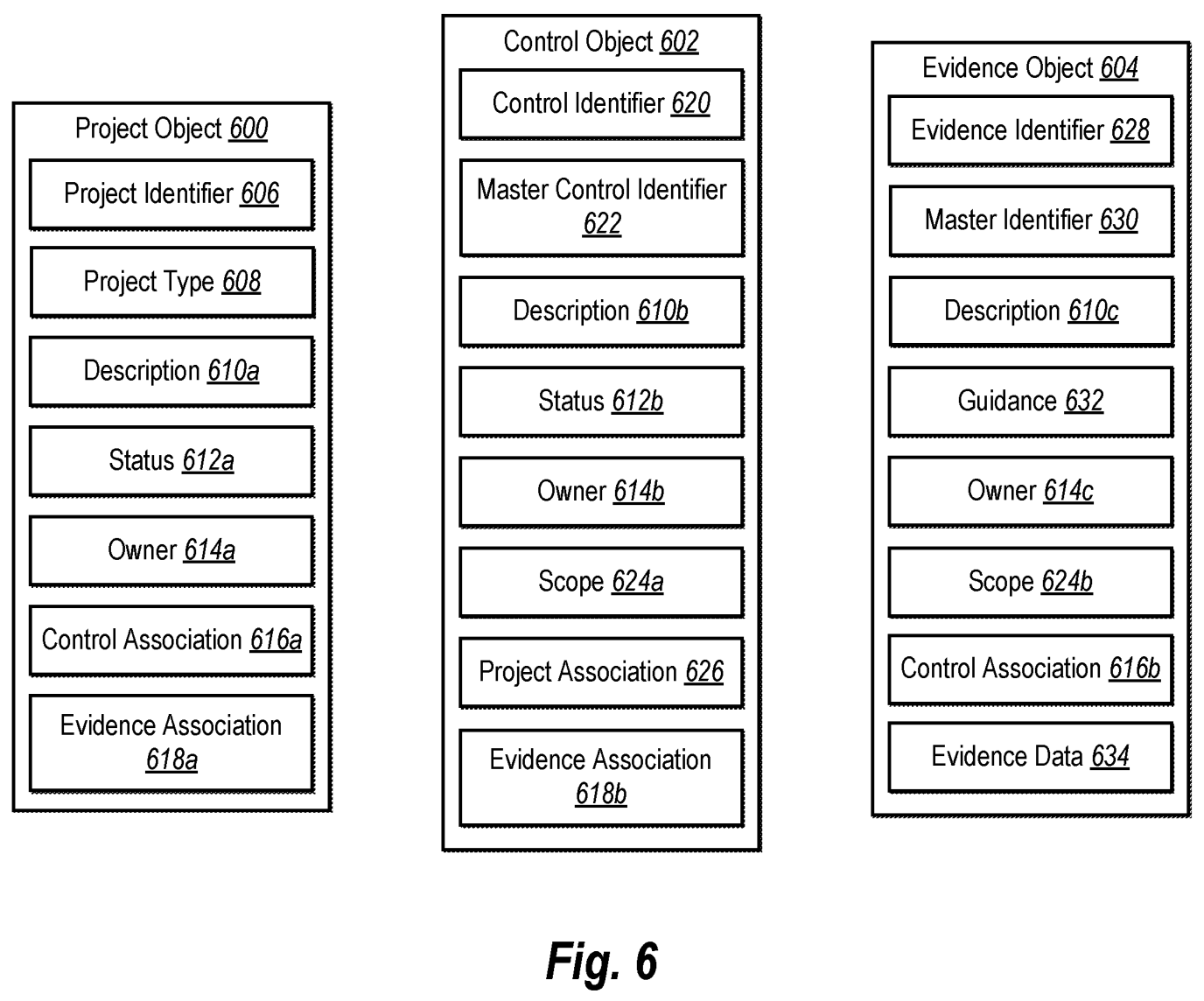

Evidence Object 604

Evidence Identifier 628

Master Identifier 630

Description 610c

Guidance 632

Owner 614c

Scope 624b

Control Association 616b

Evidence Data 634

Control Object 602

Control Identifier 620

Master Control Identifier 622

Description 610b

Status 612b

Owner 614b

Scope 624a

Project Association 626

Evidence Association 618b

Project Object 600

Project Identifier 606

Project Type 608

Description 610a

Status 612a

Owner 614a

Control Association 616a

Evidence Association 618a

*Fig. 6*

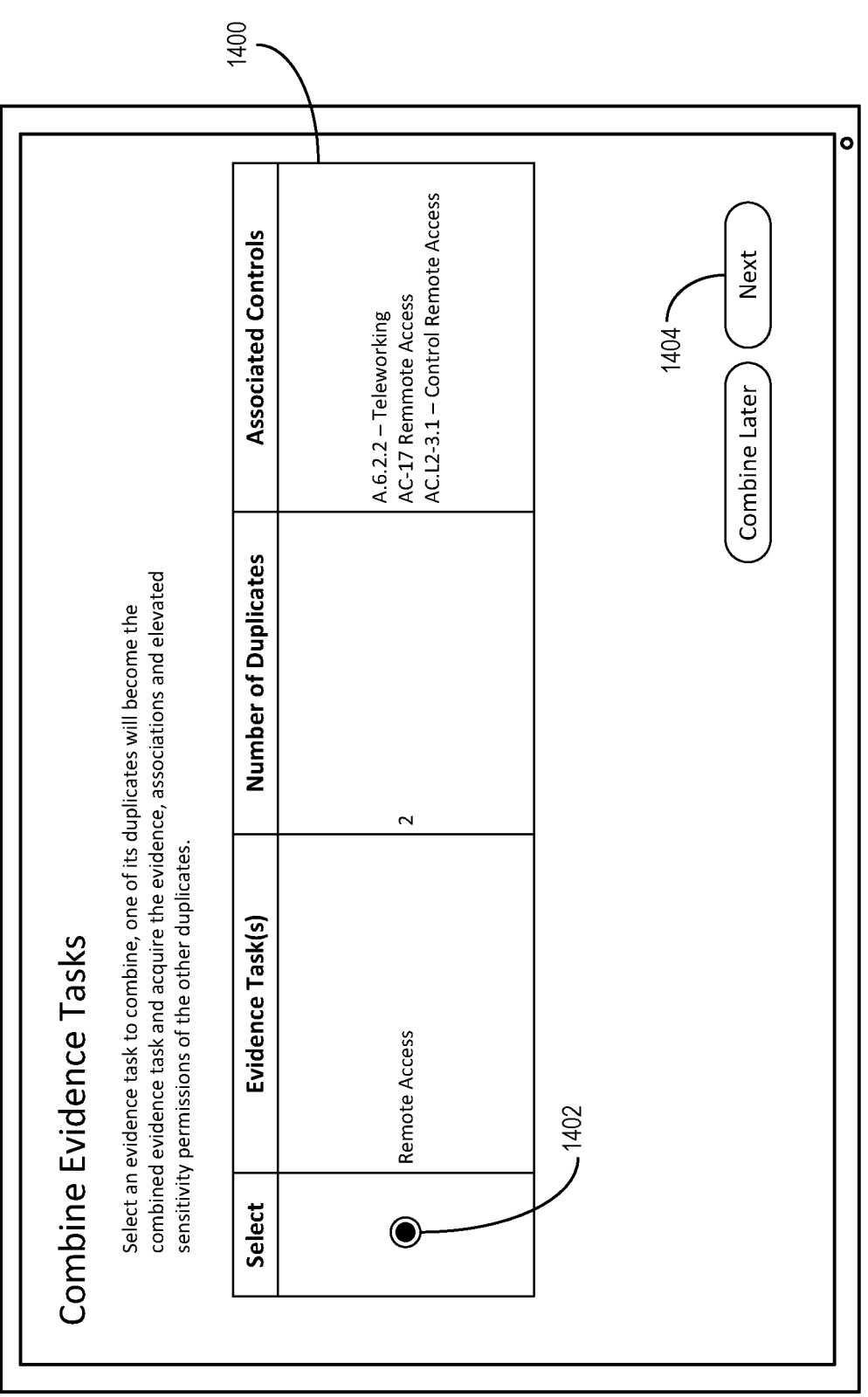

Combine Evidence Tasks

Select an evidence task to combine, one of its duplicates will become the combined evidence task and acquire the evidence, associations and elevated sensitivity permissions of the other duplicates.

| Select | Evidence Task(s) | Number of Duplicates | Associated Controls |
|--------|------------------|----------------------|---------------------|
| ● | Remote Access | 2 | A.6.2.2 – Teleworking<br>AC-17 Remmote Access<br>AC.L2-3.1 – Control Remote Access |

Combine Later    Next

*Fig. 14*

Figure 17:
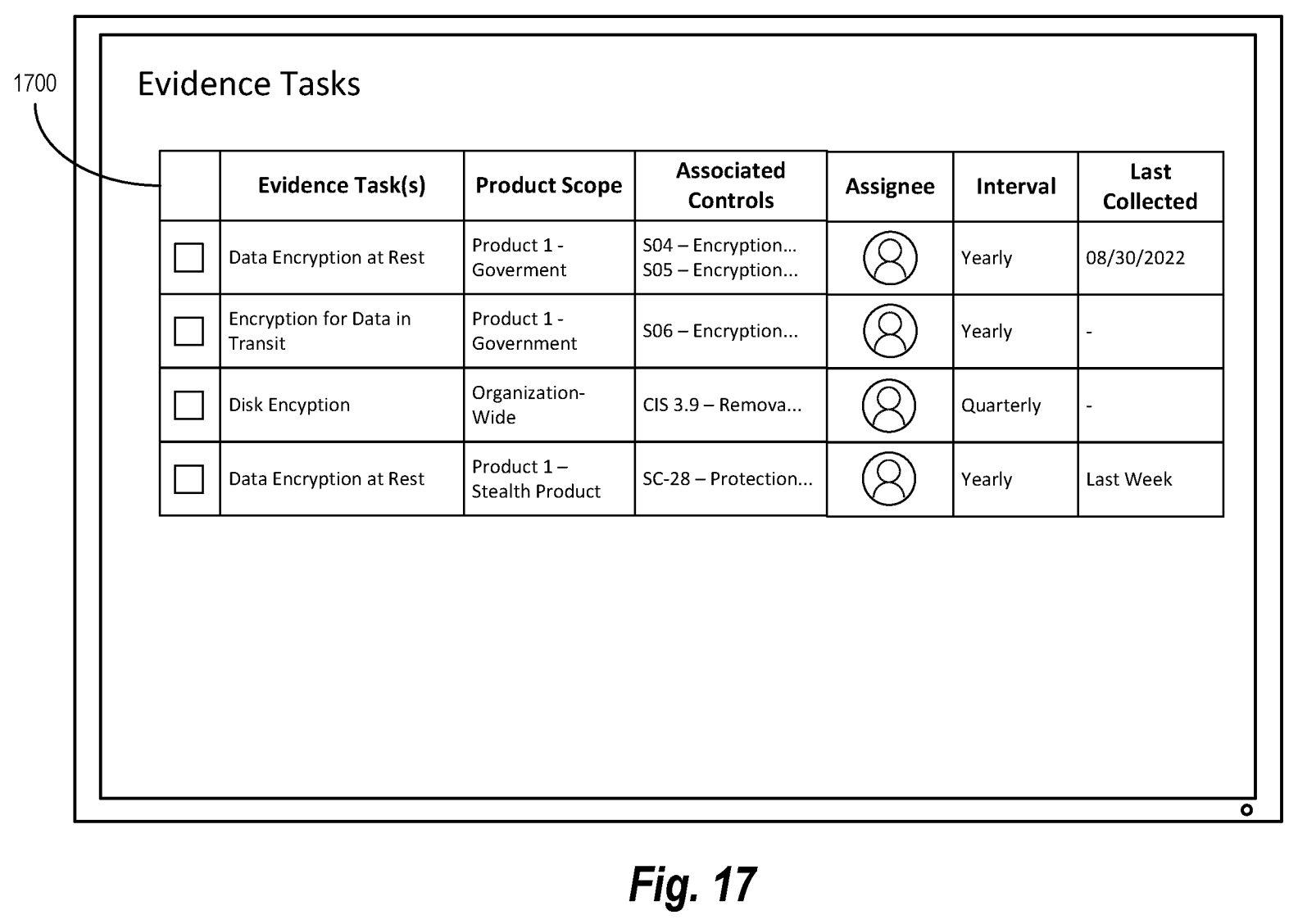

Evidence Tasks

| | Evidence Task(s) | Product Scope | Associated Controls | Assignee | Interval | Last Collected |
|---|---|---|---|---|---|---|
| ☐ | Data Encryption at Rest | Product 1 – Goverment | S04 – Encryption... S05 – Encryption... | ⊗ | Yearly | 08/30/2022 |
| ☐ | Encryption for Data in Transit | Product 1 – Government | S06 – Encryption... | ⊗ | Yearly | - |
| ☐ | Disk Encryption | Organization-Wide | CIS 3.9 – Remova... | ⊗ | Quarterly | - |
| ☐ | Data Encryption at Rest | Product 1 – Stealth Product | SC-28 – Protection... | ⊗ | Yearly | Last Week |

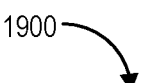

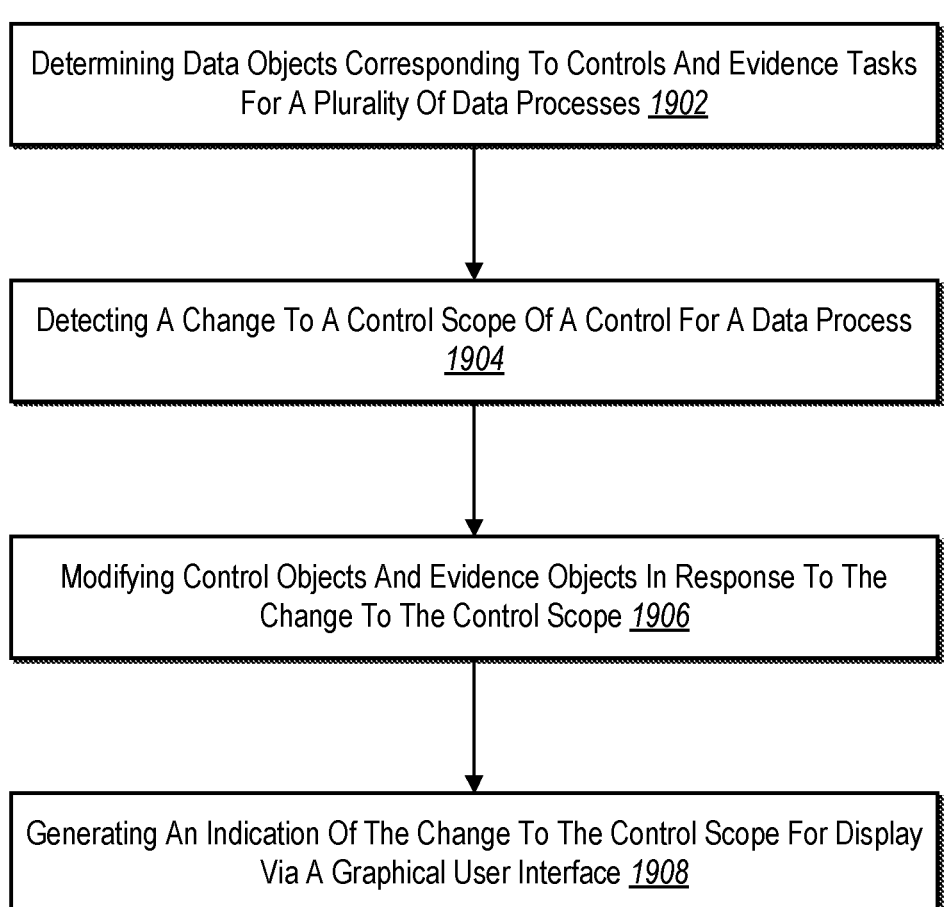

1900

Determining Data Objects Corresponding To Controls And Evidence Tasks For A Plurality Of Data Processes *1902*

Detecting A Change To A Control Scope Of A Control For A Data Process *1904*

Modifying Control Objects And Evidence Objects In Response To The Change To The Control Scope *1906*

Generating An Indication Of The Change To The Control Scope For Display Via A Graphical User Interface *1908*

*Fig. 19*

MODIFYING CONTROL SCOPES OF CONTROLS ACROSS A PLURALITY OF DATA PROCESSES VIA DATA OBJECTS

BACKGROUND

Advances in computer processing and data storage technologies have led to a significant increase in the amount and types of data moved to digital environments for processing. Specifically, many entities utilize computing devices to store, analyze, and transmit different types of data. Computing systems handling (e.g., collecting, receiving, transmitting, storing, processing, sharing, and/or the like) certain types of digital data are often subject to handling such data in a compliant manner according to different regulations or frameworks. More specifically, many data processes for handling data are subject to various laws, regulations, and industry standards that include requirements for handling such types of data in specific ways (e.g., via certain computing processes, limitations, or capabilities) for security and privacy reasons.

To illustrate, many systems require that financial data associated with payment cards be handled according to the Payment Card Industry Data Security Standard ("PCI DSS"), which specifies twelve different requirements for compliance with a system requirements framework for protecting cardholder data. Accordingly, computing systems that are involved in handling such financial data are required to implement specific controls via data asset structures, applications, or communications methods to be in compliance with the PCI DSS. For example, some controls involved in PCI DSS include installing and maintaining a firewall configuration to protect cardholder data, implementing data retention and disposal policies for cardholder data storage, and masking primary account numbers (PANs) when displayed to prevent unauthorized users/systems from having access to the full PANs.

Due to different system requirements frameworks having different control requirements, implementing such controls in computing systems can be a challenging task. In particular, due to the complexity and scale of many large data processes (e.g., in a credit card processing system), the overall computing system used to complete processing operations may include a large number of individual data assets (e.g., servers, storage devices, software applications) and data processes (e.g., transferring data between data assets, storing data in a data asset, interfacing with external systems). Additionally, large scale computing systems can often include data assets and data processing activities in different locations/jurisdictions, thus invoking different applicable system requirements frameworks (e.g., different applicable laws, regulations, or standards) that each may include the same or different controls. Implementing such computing systems with the various controls can add significant technical challenges to comply with the different system requirements frameworks based on the number of different requirements for handling specific data types in the different jurisdictions. Furthermore, as system requirements frameworks, computing systems, and data change over time, adapting computing systems corresponding to the system requirements frameworks and corresponding controls can introduce additional technical challenges.

SUMMARY

This disclosure describes one or more embodiments of methods, non-transitory computer readable media, and systems that solve the foregoing problems (in addition to providing other benefits) by managing controls for various data processes by modifying data objects in connection with changing control scopes of the controls. Specifically, in response to a request to change a control scope of a control for one or more data processes associated with an entity, the disclosed systems determine data objects corresponding to the data process(es) affected by the change in control scope (e.g., by a change in hierarchy level of the control). The disclosed systems modify the data objects (e.g., control objects and evidence objects) of the data process(es) to reflect the updated hierarchy level of the control by modifying specific attribute values indicating updated associations, assigned users, and controls associated with the data process(es). Furthermore, the disclosed systems generate indications of the change to the control scope for the data process(es) for display via a graphical user interface of a computing device associated with the entity. Additionally, in some embodiments, the disclosed systems automatically detect whether data analysis projects involving the data objects associated with the data process(es) are active to determine whether to prevent (or delay) changing of the control scope. The disclosed systems thus provide efficient and flexible management of computing systems that manage controls for handling digital data across a variety of data processes within a computing environment. The disclosed systems also provide an efficient graphical user interface for changing, and determining the effects of changes to, control scopes for data processes.

BRIEF DESCRIPTION OF THE DRAWINGS

Various embodiments will be described and explained with additional specificity and detail through the use of the accompanying drawings.

FIG. 6 illustrates an example of data objects for controls, evidence tasks, and data analysis projects in accordance with one or more embodiments.

FIGS. 14-16 illustrate examples of graphical user interfaces for viewing and modifying evidence tasks for data processes via data objects in accordance with one or more embodiments.

FIG. 17 illustrates an example of a graphical user interface for viewing evidence tasks for data processes in accordance with one or more embodiments.

FIG. 19 illustrates an example flowchart of a process for modifying a control scope of a control for one or more data processes via a plurality of data objects corresponding to controls and evidence tasks in accordance with one or more embodiments.

DETAILED DESCRIPTION

Figure 1:
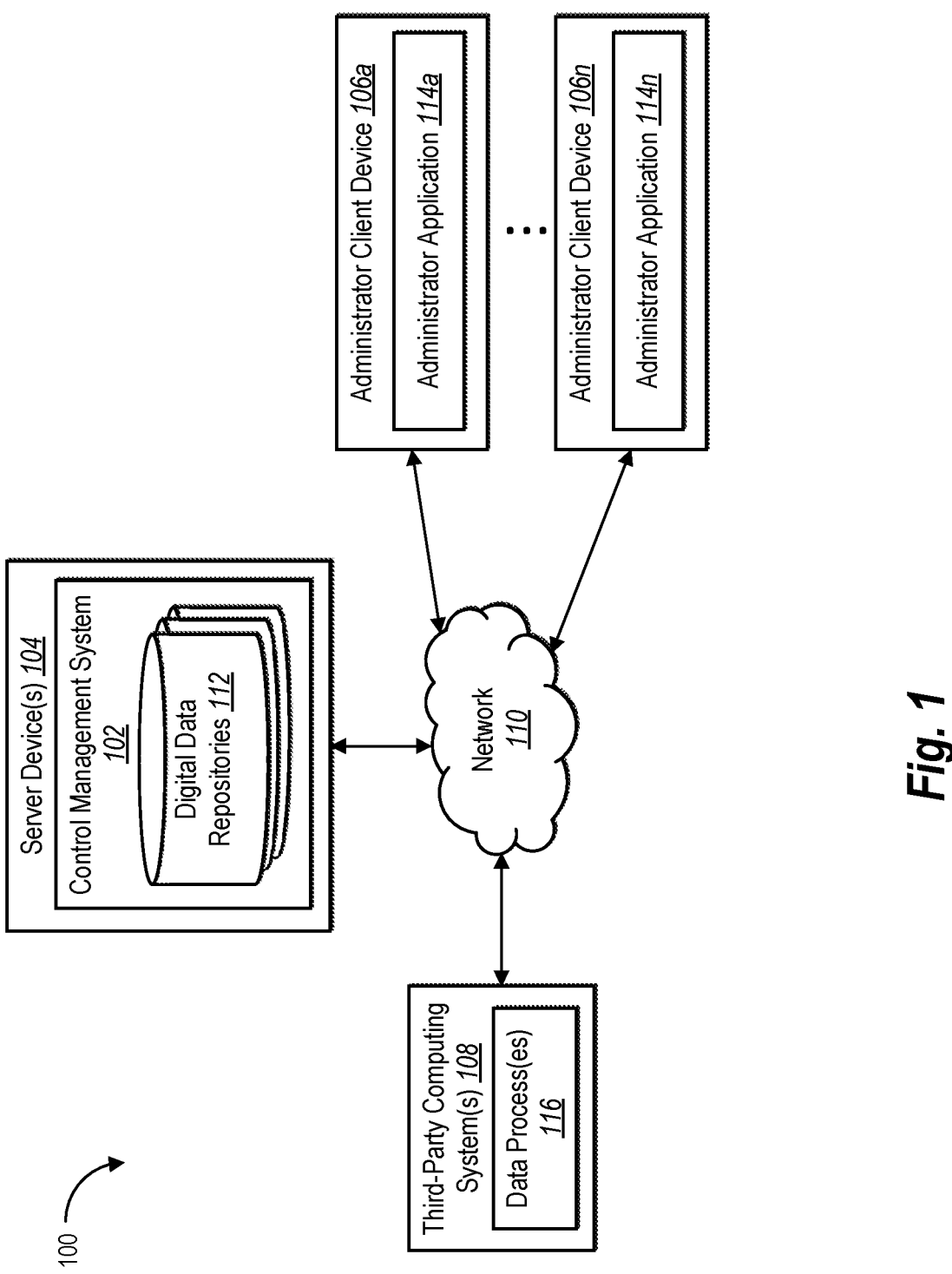
FIG. 1 illustrates an example of a system environment in which a control management system can operate in accordance with one or more embodiments.

This disclosure describes one or more embodiments of a control management system that managing controls for data processes of an entity by modifying data objects and associations between the data objects within a digital data repository in connection with changing scopes of the controls. In one or more embodiments, the control management system provides controls that determine and/or indicate requirements of functionality of data processes on various data types in a computing environment. In response to detecting a change to a control scope of a control associated with one or more data processes, the control management system accesses the digital data repository to determine data objects affected by the change in control scope. Specifically, the control management system determines one or more control objects corresponding to the control and one or more evidence objects representing evidence tasks corresponding to the data processes and/or the control. The control management system modifies the control object(s) and evidence object(s) according to the change in control scope (e.g., by merging, splitting, or cloning specific data objects). Thus, the control management system provides tools for changing a hierarchy level associated with a particular control and the functionality of corresponding data processes by updating a plurality of data objects.

In one or more embodiments, as mentioned, the control management system manages controls for applying various requirements to handling data in various data processes within a computing environment. Specifically, the control management system provides tools for implementing a particular control with specific requirements in connection with one or more data processes (e.g., processes grouped into data stacks such as by product, organizational unit, region, etc.). Furthermore, the control management system provides tools for managing the scope of the control across various data processes, such as by changing a hierarchy level of the control from a first hierarchy level (e.g., one or more specific data process) to a second hierarchy level (e.g., organization-wide or globally).

In additional embodiments, in connection with changing a scope of a control for one or more data processes, the control management system accesses a plurality of data objects affected by the scope change. In particular, the control management system determines control objects and evidence objects associated with data processes affected by the scope change. Additionally, the control management system modifies the corresponding control objects and evidence objects to change attribute values, associations, and/or other information within the control objects and evidence objects based on the updated control scope. The control management system thus provides tools for merging, cloning, removing, or otherwise changing data objects based on changes to a control scope with respect to one or more data processes. By changing the underlying data objects corresponding to controls, evidence tasks, and data analysis projects associated with handling data types in the one or more data processes, the control management system updates control implementations for the various data processes within the computing environment.

According to one or more embodiments, the control management system also provides tools for determining data analysis projects that can affect control scope changes. For instance, certain data analysis projects including operations that access and analyze data objects associated with one or more data processes. While such data analysis projects are active/ongoing, the control management system can determine that corresponding data objects should not change to prevent errors and incorrect results in the data analysis projects. Thus, the control management system can utilize the statuses of data analysis projects to determine whether to commit or prevent/delay control scope changes.

In additional embodiments, the control management system provides tools for managing individual evidence tasks (e.g., via corresponding evidence objects representing the evidence tasks). Specifically, the control management system can provide tools for modifying a control scope and/or a scope of an evidence task associated with a control. To illustrate, the control management system provides tools for cloning evidence objects representing evidence tasks to expand the scope of a given evidence task across a plurality of data processes. Accordingly, the control management system can copy the implementation of specific evidence tasks under a given control such that a plurality of different processes using the same control utilize the same evidence tasks to collect evidence of control implementation without increasing the number of controls.

Some embodiments involve including a control management system as a component of an environment that includes software and/or hardware for implementing communication, physical, and/or information security. In these embodiments, the operation of an environment including software and/or hardware for implementing communication, physical, and/or information security can be improved via inclusion of the control management system and operation of various data processes and rules applied by the control management system or other system (e.g., a compliance management system), as described herein. In one example, an environment can include the control management system as well as computing systems that implement communication security features, such as encryption tools for protecting electronic messaging, in connection with implementing required controls for an electronic messaging system (e.g., requiring end-to-end encryption). By providing tools to manage and change a scope of the control for various data processes, the control management system can implement the control for each indicated data process corresponding to a selected hierarchy level (e.g., by requiring end-to-end encryption for a plurality of selected computing applications). Furthermore, in the above example, changing the scope of the control also causes the control management system to update evidence tasks for acquiring evidence (e.g., digital files or other data) indicating that the data encryption methods have been implemented for each of the indicated data processes. The control management system can thus leverage the underlying data objects of each control, evidence task, data process, and/or data analysis project to ensure that each control is implemented accurately for the corresponding data processes through automated means for any number of client devices and computing applications involved in the data processes.

Additionally or alternatively, certain embodiments described herein can improve upon shortcomings of conventional systems in relation to managing computing systems that handle data in specific ways according to various laws, regulations, or standards. Specifically, conventional systems lack efficiency and flexibility in connection with complying with various system requirements frameworks via implementing specific controls within computing environments. For example, conventional systems typically include rigid computing system structures that fail to adapt to changes in regulatory standards and/or changes in data assets that result in being out of compliance with the regulatory standards. Indeed, the large scale nature of many computing systems subject to different system requirements frameworks often results in such conventional systems being out of compliance due to the rigid nature of the computing system structures and their inability to update data assets or data processes in a timely manner.

Furthermore, because the conventional systems lack the ability to adapt to changes in regulatory standards and/or data assets, the conventional systems also frequently handle certain data types inaccurately or expose digital data to vulnerabilities. In particular, some conventional systems utilize various data assessment processes to determine specific benchmarks or measurements in connection with certain frameworks (e.g., security frameworks). While such conventional systems can provide the benchmarks or measurements for domain-specific data at various data assets (e.g., the conventional systems are siloed), the conventional systems lack the ability to determine connections between data across a plurality of different data assets and/or data processes for different jurisdictions with changing system requirements frameworks or controls across a plurality of domains. This results in the conventional systems inaccurately handling specific types of data covered by the changing system requirements frameworks/controls.

As an example, changes to a particular framework or data asset/data process that lead to non-compliant configurations of data handling by the computing systems of the conventional systems can result in inaccurate handling of the data with respect to third-party systems. To illustrate, if a conventional system fails to identify and correct the method of handling a specific data type given a particular control of a framework, a computing system may generate, transmit, or otherwise handle data with an incorrect data format (e.g., missing headers, metadata, or incorrect encryption). This may result in a third-party system being unable to process the data (e.g., resulting in rejection of the data by the third-party system or incorrect data being extracted by the third-party system).

Certain embodiments of the disclosed control management system provide advantages over these conventional systems. For example, the control management system provides improved efficiency and flexibility for computing systems that manage data subject to various controls of system requirement frameworks. Specifically, in contrast to conventional systems with rigid computing system structures that do not adapt to changes in connection with different frameworks/controls, the control management system provide tools for changing control scopes of controls for various data processes and automatically modifying the implementation of the controls via connected data objects. More specifically, by leveraging integrations with various computing systems to merge, clone, or otherwise modify data objects for controls and evidence tasks associated with various data processes in connection with changing control scopes, the control management system provides tools for quickly and easily changing the functionality of data processes within computing environments according to the requirements of the various controls. To illustrate, the control management system provides graphical user interface tools to easily modify control scopes of various controls and update the applicability of such controls across any number of data processes based on the underlying data objects and their associations. In some embodiments, the control management system also leverages changes to system requirements frameworks and/or data processes to automatically modify scopes of specific controls to ensure compliance of the data processes with the system requirements frameworks.

Additionally or alternatively, certain embodiments of the control management system improve the accuracy of computing systems handling certain types of data in accordance with various technical controls, such as security controls or other requirements for operation of a computing system. In contrast to conventional systems that utilize domain-specific, siloed operations to implement data processes, the control management system manages the implementation of controls for different data processes across a plurality of different data domains, jurisdictions, and data assets. In particular, because the control management system detects changes to control scopes for various data processes and modifies corresponding data objects associated with the controls and evidence tasks, the control management system improves accuracy of data assets/data processes in relation to the specific data types by automatically updating the implementation of the controls in the data assets/data processes.

To illustrate, the control management system can integrate with computing hardware of a third-party system to automatically detect changes to the computing hardware or computing software—for instance, changes to the way in which a particular type of data is stored, transmitted, located, etc.—based on an analysis of files or processes of the computing hardware/software. The control management system can also communicate with computing systems associated with (or otherwise including information about) controls or system requirements frameworks to detect changes to a given control and/or framework. The control management system can utilize such information to determine a change in a control scope for one or more data processes to ensure that the data process(es) comply with the updated control or framework. As an example, the control management system can automatically detect whether a particular computing system associated with a specific data process (e.g., product or other data stack) is utilizing the correct encryption for handling a specific data type and determine a scope change to a control that would address such issues. The control management system can thus automatically detect the need for modifications to specific data processes via implementation of different control requirements and assist in addressing any non-compliance issues such as, for example, automated modification of one or more devices/computing programs to implement the correct encryption according to a specific control.

Furthermore, certain embodiments of the control management system improve the accuracy of computing systems handling certain types of data in accordance with controls by automatically detecting access to data objects in connection with data analysis projects. To illustrate, by determining whether various data objects are affected by changes to control scopes, the control management system can also determine whether the data objects are being accessed and/or otherwise subject to one or more data analysis projects (e.g., digital data auditing operations). Specifically, by verifying that certain data objects corresponding to various controls are not subject to one or more data analysis projects prior to changing a control scope, the control management system can prevent certain data in data objects and/or data processes from being corrupted, overwritten, or ignored.

Turning now to the figures, FIG. 1 includes an embodiment of a system environment 100 in which an control management system 102 is implemented. In particular, the system environment 100 includes server device(s) 104, administrator client devices 106a-106n, and third-party computing system(s) 108 in communication via a network 110. Moreover, as shown, the control management system 102 includes digital data repositories 112. FIG. 1 also shows that the administrator client devices 106a-106n include administrator applications 114a-114n, and the third-party computing system(s) 108 include data process(es) 116.

As shown in FIG. 1, in one or more embodiments, the server device(s) 104 include or host the control management system 102. Specifically, the control management system 102 includes, or is part of, one or more systems that process digital data from the digital data repositories 112 and/or the third-party computing system(s) 108. For example, the control management system 102 provides tools to the administrator client devices 106a-106n for managing data associated with an entity. In one or more embodiments, the control management system 102 provides tools to the administrator client devices 106a-106n via the administrator applications 114a-114n for viewing and managing information associated with the entity and/or data that the entity handles.

As used herein, the term "data object" refers to a digital object for tracking or managing systems, software, data sources, entities, or other functions or infrastructure involved in handling specified data for an entity. For example, a data object can include a digital representation of the entity itself, a sub-entity such as subsidiary of the entity, a business unit of the entity, a data asset, or a computing operation. Additionally, a data object can include a "control object" representing a set of requirements in a control for handling data in one or more data processes. Furthermore, a data object can include an "evidence object" representing an evidence task indicating one or more operations for collecting evidence (e.g., digital data) of implemented controls for the one or more data processes.

In one or more embodiments, as used herein, the term "data asset" refers to a computing component for handling specified data for an entity in which the data asset is represented by a data object (i.e., a "data asset object"). For example, the control management system 102 generates/ stores a data object representing a data asset including a computing component such as, but not limited to, a computing system, a software application, a website, a mobile application, or a data storage/repository. To illustrate, a data object for a data asset can represent a digital data repository (e.g., the digital data repositories 112) in the form of a database used for storing specified data. Additionally, a data object for a data asset can represent the third-party computing system(s) 108, or other systems. The control management system 102 thus generates and stores a plurality of data objects (e.g., at the digital data repositories 112) representing different aspects of computing operations associated with the data process(es) 116 at the third-party computing system(s) 108.

Additionally, as used herein, the term "data process" refers to a computing process that performs one or more actions associated with specified data. In some embodiments, a data process is represented by a data object (i.e., a "data process object"). For example, the control management system 102 generates/stores a data object representing a data process including, but not limited to, a computing process or action corresponding to execution of processing instructions to process, collect, access, store, retrieve, modify, or delete target data. To illustrate, for target data including credit card information and payment information associated with processing a credit card transaction, the control management system 102 generates a data object to represent a data process that collects the credit card information through a form (e.g., webpage) provided via the website and processes the credit card information with the appropriate card provider to process the credit card transaction.

In one or more embodiments, the control management system 102 also provides tools for using the data objects to manage functions or infrastructure subject to one or more laws, regulations, or standards. To illustrate, certain types of data are subject to certain requirements/controls in how the data is handled (e.g., processed, transmitted, stored). Accordingly, the control management system 102 analyzes the data objects (e.g., via one or more data analysis projects) to determine whether the functions or infrastructure represented by the data objects are in compliance with a system requirements framework that indicates the specific requirements/controls. In one or more embodiments, a system requirements framework includes a set of computer-based requirements for handling data or otherwise configuring an entity's functions or infrastructure in accordance with a corresponding standard.

As used herein, the terms "regulation," "standard," and "law" refer to an established set of practices enforceable by a governing body such as a government, professional body, or other entity that enacts the set of practices. To illustrate, regulations, standards, or laws (also referred to collectively as "regulations" or "standards") include, for example, a set of practices established by the International Organization for Standardization ("ISO"), internally by a particular organization (e.g., a multinational corporation), or a territory government (e.g., the European Union). The control management system 102 thus provides tools to manage the use, environment, or other attributes associated with functions or infrastructure handling specific data types in connection with a particular system requirements framework.

As used herein, the term "control" refers to a tool or function for satisfying a requirement from a system requirements framework for a computing environment. An example of a control is a procedure or practice for handling specific data types that entities are required to follow in connection with a regulation governing security or privacy. For instance, a control can include requirements for handling personally identifiable information, financial information, medical information, legal information, or other data types. Furthermore, as used herein, the term "control action" refers to an action to install a particular control for handling specific data types. To illustrate, control actions can include actions for monitoring physical environments, installing environmental protections, restricting or reviewing access authorization to physical data centers, installing physical security controls, implementing specific security or privacy rules within an organization, etc.

According to one or more embodiments, the control management system 102 manages data objects by communicating with the digital data repositories 112 and/or the third-party computing system(s) 108. Specifically, the control management system 102 can communicate with the digital data repositories 112 and/or the third-party computing system(s) 108 to determine or otherwise obtain information associated with the data objects. In some embodiments, one or more of the administrator client devices 106a-106n control or use the third-party computing system(s) 108 and/or the digital data repositories 112 for the entity. The control management system 102 may be configured to communicate with the digital data repositories 112 and/or the third-party computing system(s) 108 on behalf of the entity via an integration that is installed on the control management system 102 that is configured with the entity's credentials (e.g., via an integrated data extraction software application). The control management system 102 can obtain metadata or other information about the infrastructure or functions used by the entity and thereby populate attributes of the data objects with this information.

In one or more embodiments, the term "data extraction software application" refers to a computing application that operates on a computing device to extract data from the computing device or another computing device. For example, the control management system 102 includes a data extraction software application to access the digital data repositories 112 utilizing credentials (e.g., login information, tokens) and extract (e.g., obtain) data including files, directories, or data within files. Additionally, in some embodiments, the control management system 102 utilizes a data extraction software application to install one or more scripts, functions, or components of the data extraction software application at one or more other computing devices (e.g., the digital data repositories 112 and/or the third-party computing system(s) 108).

In additional embodiments, the control management system 102 communicates with the administrator client devices 106a-106n to obtain information associated with the data objects or to provide information about the data objects for display within the administrator applications 114a-114n. For instance, the control management system 102 can obtain, via user input received from an administrator client device, metadata or other information about the infrastructure or functions used by the entity and thereby populate attributes of the data objects with this information.

In one or more embodiments, the third-party computing system(s) 108 include server devices, individual client devices, or other computing devices associated with an entity. For instance, a third-party computing system includes one or more computing devices for performing a data process involving handling data associated with one or more operations of the entity subject to a particular system requirements framework. To illustrate, the third-party computing system includes one or more server devices that generate, process, store, or transmit payment card processing data subject to PCI DSS in one or more jurisdictions.

In one or more embodiments, the server device(s) 104 include a variety of computing devices, including those described below with reference to FIG. 20. For example, the server device(s) 104 includes one or more servers for storing and processing data associated with control implementation and management. In some embodiments, the server device(s) 104 also include a plurality of computing devices in communication with each other, such as in a distributed storage environment. In some embodiments, the server device(s) 104 include a content server. The server device(s) 104 also optionally includes an application server, a communication server, a web-hosting server, a social networking server, a digital content campaign server, or a digital communication management server.

In one or more embodiments, each of the administrator devices 106a-106n includes, but is not limited to, a desktop, a mobile device (e.g., smartphone or tablet), or a laptop including those explained below with reference to FIG. 20. Furthermore, although not shown in FIG. 1, the administrator devices 106a-106n can be operated by users (e.g., a user included in, or associated with, the system environment 100) to perform a variety of functions. In particular, the administrator devices 106a-106n performs functions such as, but not limited to, accessing, viewing, and interacting with data associated with managing controls for the data process(es) 116 with one or more system requirements frameworks. In some embodiments, the administrator devices 106a-106n also perform functions for generating, capturing, or accessing data to provide to the control management system 102 in connection with controls and/or evidence tasks. For example, the administrator devices 106a-106n communicate with the server device(s) 104 via the network 110 to provide information (e.g., user interactions) associated with data objects. Although FIG. 1 illustrates the system environment 100 with a plurality of administrator client device, in some embodiments, the system environment 100 includes a single administrator client device or other client devices. In some embodiments, the administrator devices 106a-106n or the server device(s) 104 also host the digital data repositories 112.

Additionally, as shown in FIG. 1, the system environment 100 includes the network 110. The network 110 enables communication between components of the system environment 100. In one or more embodiments, the network 110 may include the Internet or World Wide Web. Additionally, the network 110 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104, the administrator client devices 106a-106n, the digital data repositories 112, and the third-party computing system(s) 108 communicate via the network using one or more communication platforms and technologies suitable for transporting data and/or communication signals, including any known communication technologies, devices, media, and protocols supportive of data communications, examples of which are described with reference to FIG. 20.

Although FIG. 1 illustrates the server device(s) 104, the administrator client devices 106a-106n, the digital data repositories 112, and the third-party computing system(s) 108 communicating via the network 110, in alternative embodiments, the various components of the system environment 100 communicate and/or interact via other methods (e.g., the server device(s) 104, the administrator client devices 106a-106n, the digital data repositories 112, and/or the third-party computing system(s) 108 can communicate directly). Furthermore, although FIG. 1 illustrates the control management system 102 and the digital data repositories 112 being implemented separately within the system environment 100, the control management system 102 and the digital data repositories 112 can alternatively be implemented, in whole or in part, by a particular component and/or device within the system environment 100 (e.g., the server device(s) 104). Additionally, in some embodiments, the third-party computing system(s) 108 include the administrator client devices 106a-106n.

In some embodiments, the control management system 102 can be executed on a server system that provides a multi-tenant environment. The multi-tenant environment can include a tenant (e.g., one or more user accounts sharing common privileges with respect to an application instance) accessible by a particular set of client devices, as well as other tenants inaccessible to that set of client devices (e.g., access controlled to permit only access from other sets of client devices). For instance, in the tenant accessible by a particular client system of one or more client devices, certain data objects used by the control management system 102 may only be available to that client system (e.g., the data objects representing functions or infrastructure of the entity using the client system), with other tenants having other sets of data objects, and instances of the software components of the control management system 102 described herein may only be available to the client system, with other tenants having access other instances of these software components. In additional or alternative embodiments, the control management system 102 can be implemented on one or more computing systems operated by a single entity. For instance, the control management system 102 can be operated on a first server system controlled by the entity (e.g., via an on-premises installation of software components described herein), and can communicate with a second server system that is a client system controlled by the entity.

In some embodiments, the server device(s) 104 support the control management system 102 on the administrator client devices 106a-106n. For instance, the server device(s) 104 generates/maintains the control management system 102 and/or one or more components of the control management system 102 for the administrator client devices 106a-106n. The server device(s) 104 provides the generated control management system 102 to the administrator client devices 106a-106n (e.g., as a software application/suite). In other words, the administrator client devices 106a-106n obtain (e.g., download) the control management system 102 from the server device(s) 104. At this point, the administrator client devices 106a-106n are able to utilize the control management system 102 to manage compliance of data objects according to one or more system requirements frameworks independently from the server device(s) 104.

In alternative embodiments, the control management system 102 includes a web hosting application that allows the administrator client devices 106a-106n to interact with content and services hosted on the server device(s) 104. To illustrate, in one or more embodiments, the administrator client devices 106a-106n access a web page supported by the server device(s) 104. The administrator client devices 106a-106n provide input to the server device(s) 104 to perform compliance management operations, and, in response, the control management system 102 on the server device(s) 104 performs operations to view/manage data associated with digital data processing. The server device(s) 104 provide the output or results of the operations to the administrator client devices 106a-106n.

Figure 2:
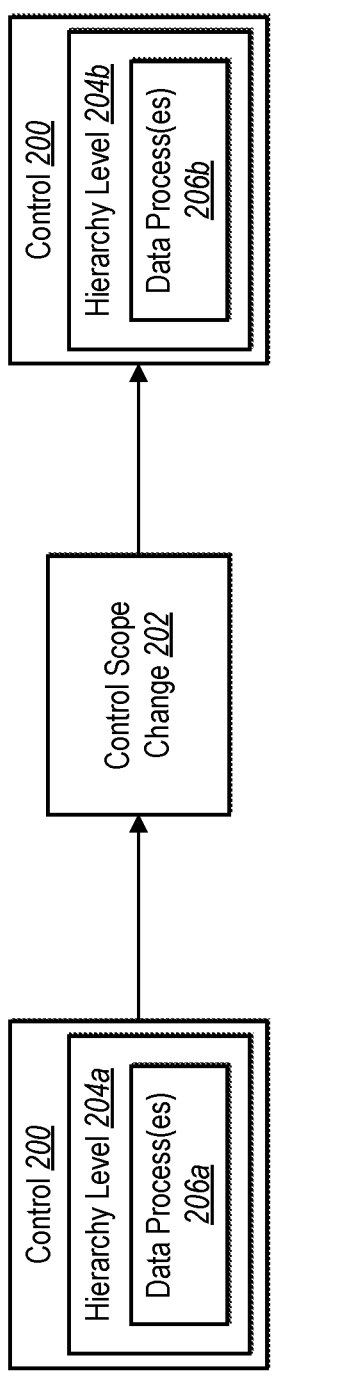
FIG. 2 illustrates an example of the control management system changing a control scope of a control for one or more data processes in accordance with one or more embodiments.

As mentioned, the control management system 102 uses data objects to manage controls in data processes that handle specific types of data associated with an entity subject to one or more system requirements frameworks. FIG. 2 illustrates an example of a change in a scope of a control for one or more data processes. For example, the control management system 102 provides tools for changing a hierarchy level of a control scope by changing the applicability/implementation of the control from one set of data processes to another set of data processes.

For example, as illustrated in FIG. 2, the control management system 102 determines a request to change a scope of a control 200 from a first scope to a second scope.

Specifically, the control management system 102 receives a request to initiate a control scope change 202 for the control 200 in connection with a manual indication of the request or an automated indication of the request. In one or more embodiments, the control management system 102 receives the request in response to a user input via a graphical user interface element at an administrator client device to initiate the control scope change 202. In alternative embodiments, the control management system 102 (or another system) automatically generates the request in response to detecting a change to the control 200, a system requirements framework, or one or more data objects associated with the control 200.

In one or more embodiments, the control management system 102 determines that the control scope change 202 updates a scope of the control 200 from a first hierarchy level 204a to a second hierarchy level 204b. In particular, the control management system 102 determines that the first hierarchy level 204a corresponds to a first set of data process(es) 206a, and the second hierarchy level 204b corresponds to a second set of data process(es) 206b. To illustrate, the control management system 102 determines that the first set of data process(es) 206a corresponding to a first set of data stacks including one or more products, organizational units, geographical regions, etc. Additionally, the control management system 102 determines that the second set of data process(es) 206b corresponding to a second set of data stacks including one or more products, organizational units, geographical regions, etc.

According to one or more embodiments, at least a portion of the first set of data process(es) 206a overlaps at least a portion of the second set of data process(es) 206b. For instance, the first hierarchy level 204a can correspond to a single data process (e.g., a process-specific hierarchy level), while the second hierarchy level 204b can correspond to a plurality of data processes that include the single data process (e.g., an organization-wide hierarchy level), or vice-versa. To illustrate, the control management system 102 changes a scope of a control requiring a specific type of data encryption from being implemented for a specific set of computing applications to being implemented for all computing applications associated with an entity. In alternative embodiments, the first hierarchy level 204a corresponds to a completely different set of data processes than the second hierarchy level 204b (e.g., no overlap between the sets of data processes).

Figure 3:
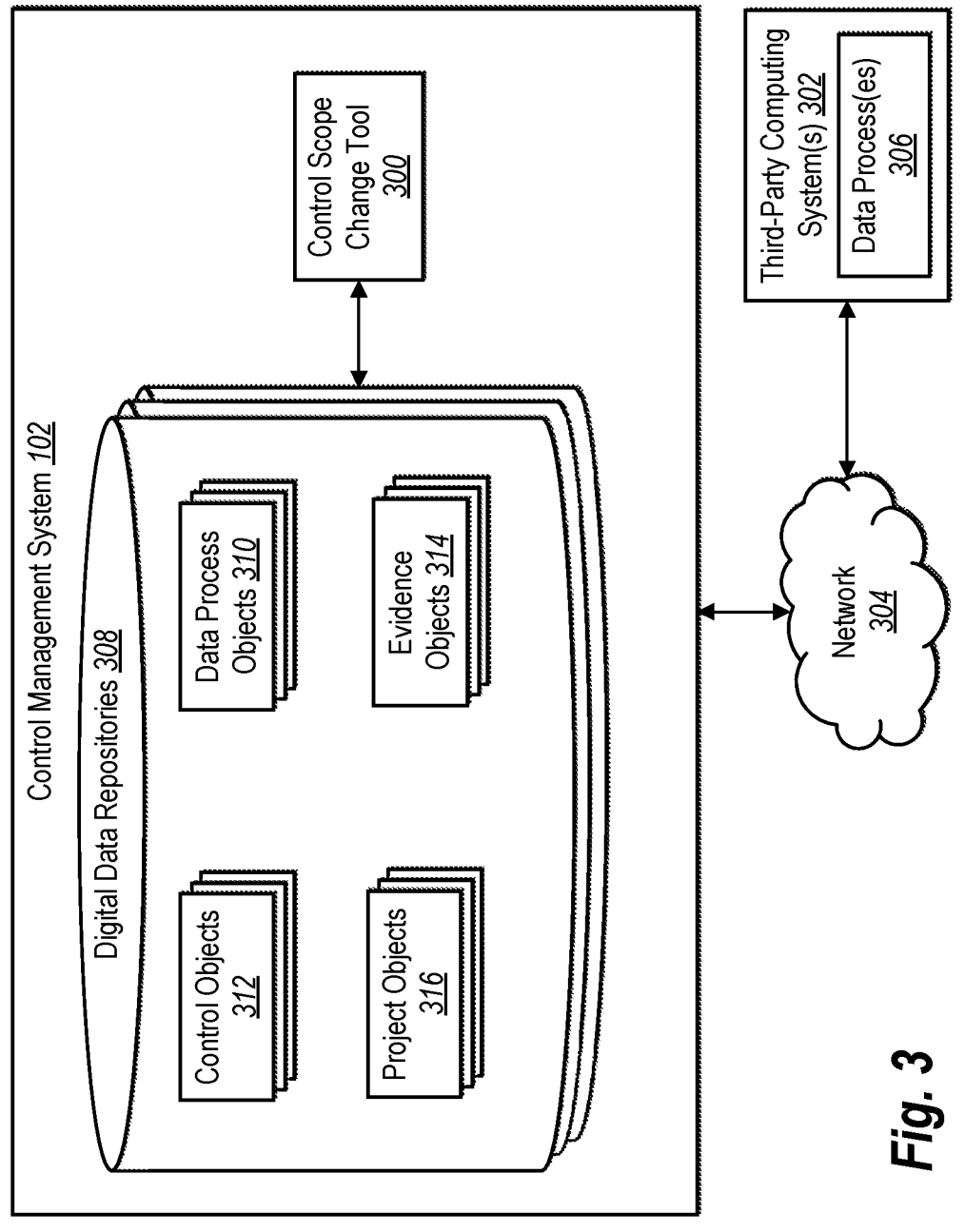
FIG. 3 illustrates an example of an overview of the control management system managing a control scope for data processes of third-party computing systems in accordance with one or more embodiments.

In one or more embodiments, the control management system 102 utilizes data objects to manage changes to control scopes of controls for various data processes. In particular, the control management system 102 generates, manages, and stores data objects representing a plurality of data processes, controls, evidence tasks, and/or data analysis projects in connection with managing control scopes for one or more data processes. FIG. 3 illustrates an example environment in which the control management system 102 manages a scope of a control for various data processes of an entity according to one or more system requirements frameworks.

FIG. 3 illustrates that the control management system 102 includes a control scope change tool 300 to manage the control scope of at least one control associated with handling data types. In one or more embodiments, the control scope change tool 300 includes a tool within a computing application to modify implementation/applicability of a control with respect to one or more data processes. Specifically, FIG. 3 illustrates that the control management system 102 communicates with third-party computing system(s) 302

(e.g., one or more computing devices associated with the entity) via a network 304 to provide management of controls associated with data process(es) 306 for handling one or more data types.

As illustrated in FIG. 3, the control management system 102 includes digital data repositories 308. In particular, the digital data repositories include data associated with one or more entities. To illustrate, a first digital data repository of the digital data repositories 308 includes data associated with a first entity, a second digital data repository of the digital data repositories 308 includes data associated with a second entity, etc. Alternatively, the digital data repositories 308 store different data types within each digital data repository. Accordingly, a single digital data repository may store data associated with a plurality of different entities. Furthermore, the digital data repositories 308 may store data for an entity across a plurality of digital data repositories.

In one or more embodiments, the digital data repositories 308 store data associated with the data process(es) 306 of the third-party computing system(s) 302. In the example depicted in FIG. 3, the digital data repositories 308 store a plurality of data objects that include data process objects 310, control objects 312, evidence objects 314, and project objects 316. Specifically, the digital data repositories 308 store data objects representing the data process(es) 306, one or more controls for implementing in connection with the data process(es) 306, evidence tasks for collecting data indicating proof of implementation of the controls for the data process(es) 306, and data analysis projects analyzing the data objects associated with the data process(es) 306, controls, and/or evidence tasks.

In one or more embodiments, the control management system 102 utilizes the controls to establish specific requirements for the data process(es) 306. For example, the control management system 102 can utilize one or more control actions to install controls for complying within one or more system requirements frameworks in connection with the data process(es) 306. In at least some embodiments, a system requirements framework includes a digital representation of a set of operations to assess the data process(es) 306, such as in connection with certifying privacy or security requirements according to one or more standards or regulations. Accordingly, a digital representation of a particular framework includes one or more files indicating required controls for complying with the framework. The control management system 102 can utilize the controls to ensure that hardware and software processes and infrastructure comply with specific system requirements frameworks via the various data objects in the digital data repositories 308.

According to one or more embodiments, the control management system 102 stores the data objects with specific attribute values within the digital data repositories 308. Specifically, the data objects include attribute values that indicate details associated with the specific data processes, controls, evidence tasks, and/or data analysis projects. Additionally, the data objects can include information indicating relationships between the data objects—e.g., relationships between specific data process objects, control objects, evidence objects, and/or project objects. In additional embodiments, the control management system 102 stores linking objects indicating linking data between specific data objects in connection with various data processes, controls, evidence tasks, and/or data analysis projects.

Furthermore, in some embodiments, the control management system 102 modifies the data objects based on changes to the data processes, controls, evidence tasks, and/or data analysis projects. To illustrate, the control management system 102 modifies various data objects in response to detecting changes to a control scope of a control. For example, in response to determining a change to a particular control in connection with one or more data processes, the control management system 102 can modify corresponding data process objects, control objects, evidence objects, and/or project objects.

According to one or more embodiments, the control management system 102 identifies one or more control objects, one or more evidence objects, and/or one or more project objects in connection with a control scope change. In particular, the control management system 102 can determine the control scope change in response to a change to a control object. Alternatively, the control management system 102 can determine the control scope change according to an input requesting the change from an administrator client device. The control management system 102 can modify the identified data objects identified in response to a control scope change by updating various attribute values of the identified data objects.

In one or more additional embodiments, the control management system 102 utilizes data analysis projects to analyze data associated with data processes. Specifically, the control management system 102 (or another system) utilizes auditing projects, readiness projects, or risk analysis projects to determine whether the data processes are in compliance with one or more system requirements frameworks. For instance, the control management system 102 can determine whether a particular control is implemented for a particular data process. To illustrate, the control management system 102 can utilize an audit project to determine whether a control indicating specific data encryption requirements is implemented for a data process involving handling personally identifiable information in a payment transaction process by analyzing corresponding data objects.

In one or more embodiments, the control management system 102 also utilizes one or more project objects to determine whether to allow, delay, or prevent a control scope change. For example, the control management system 102 utilizes the project objects to determine whether a particular data analysis project is active that may prevent changes to one or more data objects. To illustrate, in response to determining that a particular data analysis project (e.g., an audit project) is active for one or more data processes, the control management system 102 can prevent a control scope change that otherwise results in modifying data objects covered by the active data analysis project. Thus, as previously mentioned, the control management system 102 can prevent certain data objects from becoming corrupted, deleted, or changed that can affect the operation of a data analysis project and/or one or more data processes.

Figure 4:
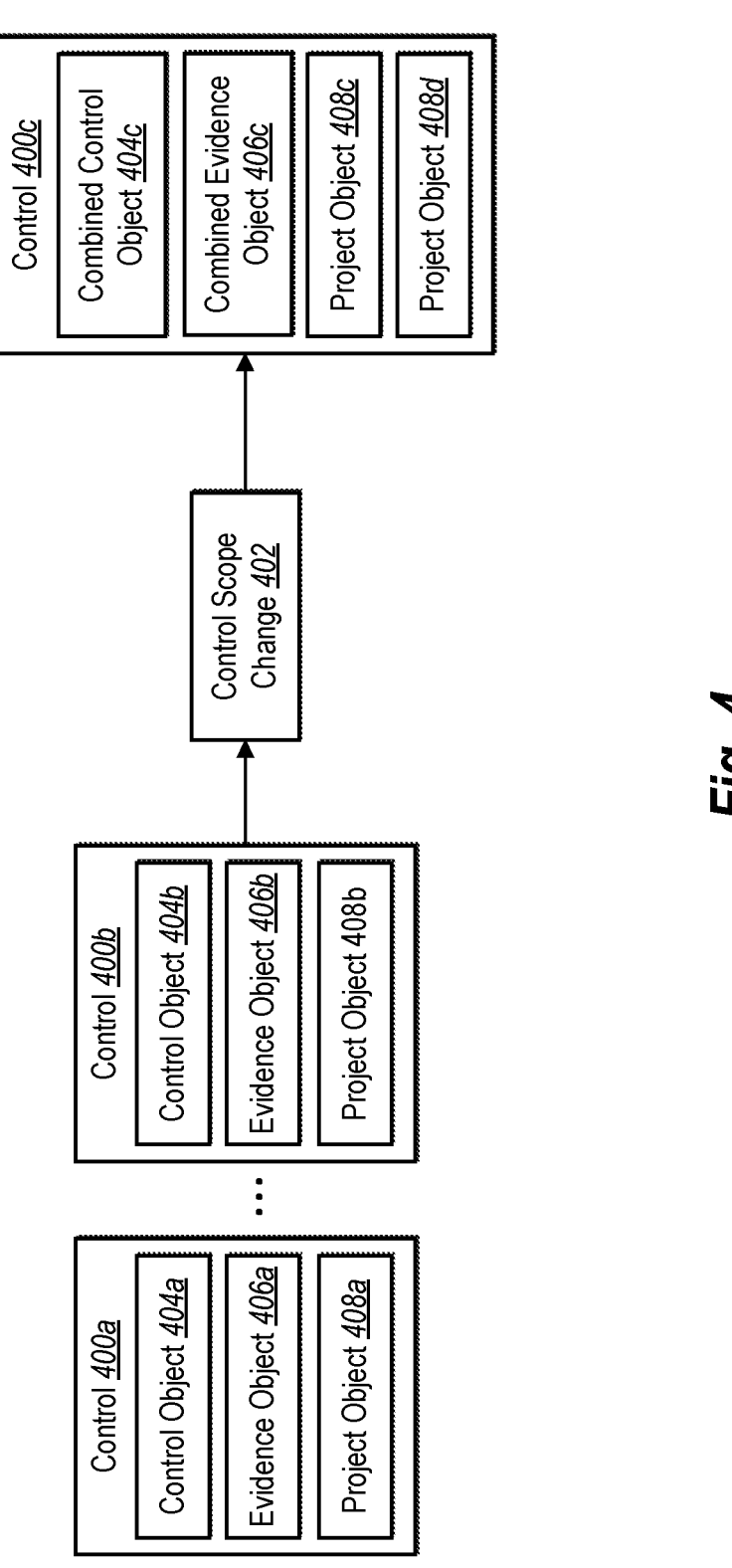
FIGS. 4-5 illustrate examples of the control management system modifying data objects in response to changing control scopes in accordance with one or more embodiments.
Figure 5:
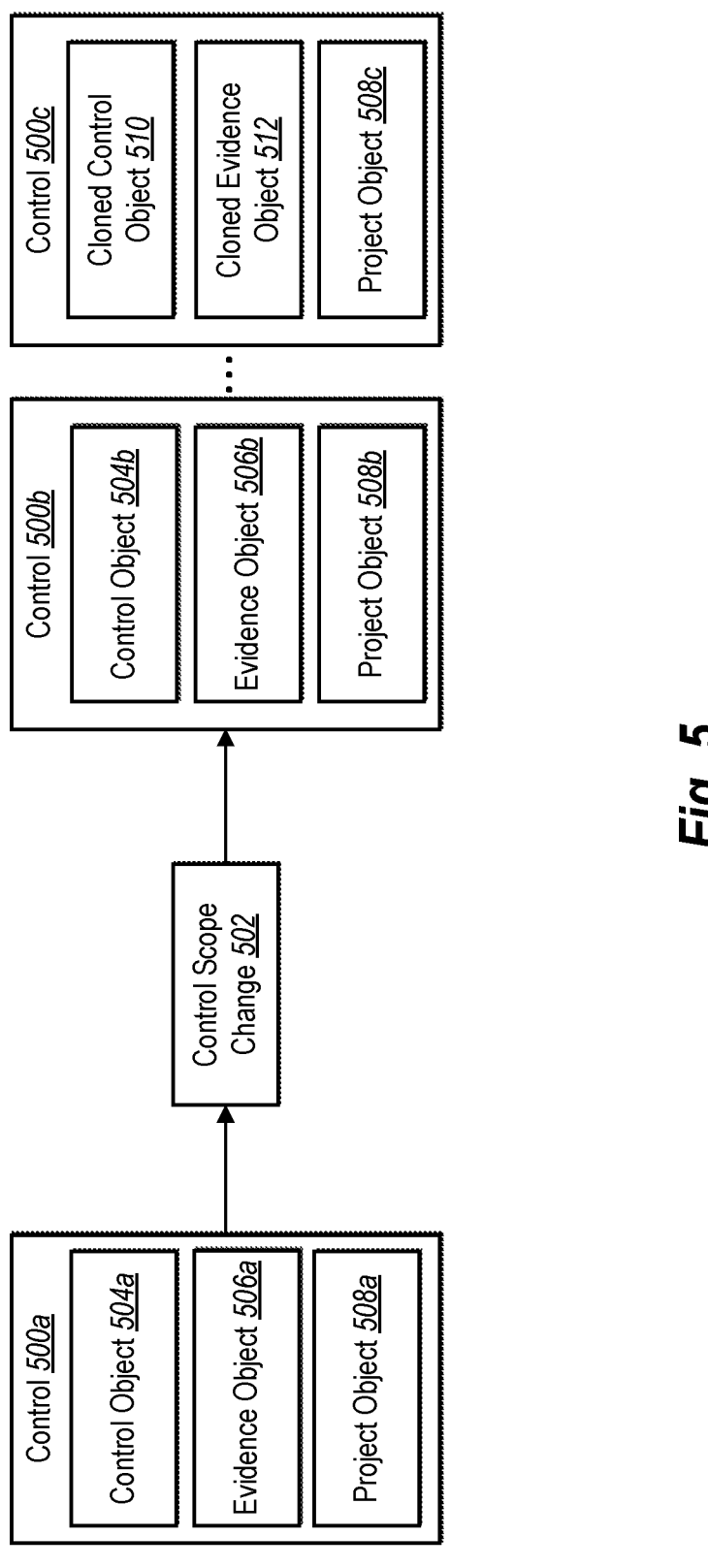

In one or more embodiments, as mentioned, the control management system 102 manages control scopes of controls in connection with various data processes by modifying a plurality of data objects. FIGS. 4-5 illustrate examples of the control management system 102 modifying hierarchy levels of controls in connection with a plurality of data processes. Specifically, FIG. 4 illustrates the control management system 102 changing a hierarchy level of a control to a higher hierarchy level. FIG. 5 illustrates the control management system 102 changing a hierarchy level of a control to a lower hierarchy level.

In one or more embodiments, as mentioned, FIG. 4 illustrates the control management system 102 modifying a control by changing a hierarchy level of the control from a first set of data processes to a second set of data processes. In particular, the control management system 102 determines that a first hierarchy level corresponds to a plurality of separate data processes, the control implemented for each data process independently. For example, the control management system 102 can determine that the control corresponds to a first data process and a second data process independently. To illustrate, a first control instance 400a corresponds to an implementation of the control for a first data process and a second control instance 400b corresponds to an implementation of the control for a second data process.

Additionally, the control management system 102 can determine a plurality of data objects affected by a control scope change 402 modifying the scope of the control from the first hierarchy level to the second hierarchy level. Specifically, as illustrated in FIG. 4, the control management system 102 determines that a first set of data objects corresponding to the first control instance 400a for the first data process includes a first control object 404a, a first evidence object 406a, and a first project object 408a. Additionally, the control management system 102 determines that a second set of data objects corresponding to the second control instance 400b for the second data process includes a second control object 404b, a second evidence object 406b, and a second project object 408b.

In one or more embodiments, the first control object 404a includes data indicating implementation of the first control instance 400a with the first data process. Additionally, the first evidence object 406a includes data indicating an evidence task associated with implementing the control for the first data process. Furthermore, the first project object 408a indicates implementation of a data analysis project associated with implementation of the control for the first data process.

In additional embodiments, the second control object 404b includes data indicating implementation of the second control instance 400b with the second data process. The second evidence object 406b includes data indicating an evidence task associated with implementing the control for the second data process. Additionally, the second project object 408b indicates implementation of a data analysis project associated with implementation of the control for the second data process. In some embodiments, the first project object 408a and the second project object 408b correspond to the same analysis project applied to the first data process and the second data process. In alternative embodiments, the first project object 408a and the second project object 408b correspond to different data analysis projects.

Although FIG. 4 illustrates that the first set of data objects includes the first control object 404a, the first evidence object 406a, and the first project object 408a, in alternative embodiments, the first set of data objects includes more or fewer data objects. To illustrate, the first set of data objects may include no project objects, indicating that no data analysis projects are associated with implementation of the control for the first data process. Alternatively, the first set of data objects can include more than one project object corresponding to a plurality of different data analysis projects associated with implementation of the control for the first data process. Similarly, the second set of data objects can include more or fewer data objects in connection with the second data process.

In response to detecting the control scope change 402, the control management system 102 reconfigures the data objects in the sets of data objects according to the updated hierarchy level. To illustrate, the data process hierarchy can include a plurality of different relationships associated with various data processes, such as within a node-edge structure or other structure. In one or more embodiments, the data process hierarchy includes a plurality of nodes connected by one or more edges indicating relationships between various data processes, such as by indicating groups of computing applications (e.g., software suites) or associated organizational units (e.g., departments within an entity). In additional embodiments, the data process hierarchy includes indications of process-specific hierarchy levels, process group hierarchy levels, and/or organization/entity-wide hierarchy levels.

Thus, in some embodiments, the control management system 102 utilizes the data process hierarchy to determine how to modify data objects according to the control scope change 402. For example, in response to determining that the second hierarchy level is higher than the first hierarchy level in a data process hierarchy, the control management system 102 identifies the data objects affected by the control scope change 402 and determines how to modify the data objects. To illustrate, in response to changing the hierarchy level of the control from a process-specific hierarchy level (e.g., separate instances of a control for separate data processes) to an organization-wide hierarchy level, the control management system 102 merges the corresponding data objects.

Specifically, as illustrated in FIG. 4, the control management system 102 generates a combined control instance 400c for a plurality of data processes. In particular, the control management system 102 merges the first control object 404a and the second control object 404b to generate a combined control object 404c. In particular, a "combined control object" refers to a control object that corresponds to a combined control instance resulting from merging control objects (e.g., data associated with controls) for a plurality of separate controls. To illustrate, generating the combined control object 404c can include merging a plurality of data files (or portions of one or more data files) into a single data file (or portion of a data file) corresponding to a control. In one or more embodiments, the control management system 102 selects the combined control object 404c from one of the individual control objects and removes the duplicate control objects. Alternatively, the control management system 102 generates the combined control object 404c as a new data object.

The control management system 102 can also merge the first evidence object 406a and the second evidence object 406b to generate a combined evidence object 406c. In one or more embodiments, a "combined evidence object" refers to an evidence object that corresponds to a combined control instance or a combined evidence task resulting from merging evidence objects for a plurality of separate controls or a plurality of separate evidence tasks. For example, generating the combined evidence object 406c includes merging a plurality of data files (or portions of one or more data files) into a single data file (or portion of a data file) corresponding to an evidence task. Furthermore, in some embodiments, the control management system 102 includes a third project object 408c (e.g., corresponding to the first project object 408a) and a fourth project object 408d (e.g., corresponding to the second project object 408b) with the combined control instance 400c to indicate that a first data analysis project and second data analysis project correspond to the combined control instance 400c. Alternatively, the control management system 102 can combine a plurality of project objects in response to determining that a single data analysis project applies to a combined control instance.

As mentioned, FIG. 5 illustrates an example of the control management system 102 modifying a hierarchy level of a control from a scope corresponding to a first control instance 500a for one or more data processes to a plurality of separate control instances (e.g., a second control instance 500b and a third control instance 500c) for a plurality of separate data processes in response to a control scope change 502. In one or more embodiments, the control scope change 502 changes the control scope of a control to implement the control in connection with a plurality of data processes utilizing similar implementation data as the first control instance 500a. For example, the first control instance 500a can include a combined control instance for a plurality of separate data processes, such as at an organization-wide hierarchy level. Alternatively, the first control instance 500a includes a control instance for a single data process.

In response to detecting the control scope change 502, the control management system can modify data objects associated with the first control instance 500a. In particular, as illustrated, the control management system 102 determines that the first control instance 500a corresponds to a set of data objects including a first control object 504a, a first evidence object 506a, and a first project object 508a. The control management system 102 can utilizes the data objects corresponding to the first control instance 500a to generate a second control instance 500b and a third control instances 500c, each corresponding to a separate data process or group of data processes.

In connection with generating the separate control instances, the control management system 102 determines new sets of data objects for the control instances. For example, as illustrated in FIG. 5, the control management system 102 generates a second set of data objects for the second control instance 500b including a second control object 504b, a second evidence object 506b, and a second project object 508b. To illustrate, the control management system 102 utilizes the first set of data objects corresponding to the first control instance 500a to generate the second set of objects by extracting specific attribute values from the first set of data objects to use in generating the second set of data objects.

In one or more embodiments, the control management system 102 generates a third set of data objects for the third control instance 500c including a third control object, a third evidence object, and a third project object. In particular, in connection with implementing the control from a single data process to a plurality of data processes, the control management system 102 can generate the third set of data objects by cloning one or more data objects from one or more sets of data objects. For instance, the control management system 102 can clone one or more data objects from the second set of data objects corresponding to the second control instance 500b. To illustrate, the control management system 102 can generate a cloned control object 510 based on the second control object 504b, a cloned evidence object 512 based on the second evidence object 506b, and a third project object 508c. In additional embodiments, the control management system 102 generates the cloned data objects based on the first set of data objects corresponding to the first control instance 500a or a combination of the first set of data objects and the second set of data objects.

Although FIG. 5 illustrates that each of the control instances includes a project object corresponding to one or more data analysis projects, the control instances at each hierarchy level may have different numbers of project objects. For example, an initial control instance may have more than one project objects or no project objects. Additionally, the target control instances may each have more than one project object or no project objects. Furthermore, the project objects for each of the control instances may be different, indicating different data analysis projects corresponding to the respective data processes. As an example, an audit project may be associated with one or more data processes for the initial control instance and one or more different audit projects, readiness projects, or risk analysis projects may be associated with one or more data processes for the target control instance(s).

Furthermore, FIGS. 4 and 5 illustrate that the control management system 102 generates control objects and evidence objects for each set of data objects. In some instances, the control management system 102 merges or clones one or more control objects and one or more evidence objects corresponding to a control in connection with changing a control scope. In alternative instances, the control management system 102 merges or clones one or more control objects or one or more evidence objects independently in connection with changing a control scope. For example, the control management system 102 may merge or clone a clone object without merging or cloning a related evidence object in connection with changing a control scope, or vice-versa. The control management system 102 determines whether to clone each specific data object based on the applicability of corresponding information in connection with the target control scope and/or based on whether a particular data object is affected by the change in the control scope.

In at least some embodiments, although FIGS. 4 and 5 illustrate specific changes to a control scope of a control, the control management system 102 can also change control scopes according to other configurations. For example, the control management system 102 can change a control scope of a control from implementation with a first data process or group of data processes to a second data process or group of data processes. In some instances, the changes result in one or more overlapping data processes, while in others the changes result in no overlapping data processes. Accordingly, the control management system 102 can determine whether to merge, clone, or generate new data objects based on the available data objects and relevant attribute values of existing data objects based on initial control scopes and target control scopes. The control management system 102 can thus provide management of controls for various data processes with flexible granularity—e.g., for implementing controls with individual computing applications (or other data stacks), globally, or at some intermediate hierarchy level.

In some embodiments, the control management system 102 stores data objects corresponding to data processes, data analysis projects, controls, and/or evidence tasks in (or alongside) a plurality of data structures indicating relationships between the data objects. For example, the control management system 102 stores a first data structure (e.g., a table) including mappings indicating relationships between controls and data analysis projects, such as in a "project-controls" table in which each entry indicates a project-control pair. In an additional example, the control management system 102 stores a second data structure including mappings indicating relationships between controls and evidence tasks, such as in a "control-evidence task" table in which each entry identifies a control-evidence task pair. Thus, generating data sets for instances of controls for one or more data processes can include modifying the data objects and/or the data structures, such as by modifying mappings within one or more control objects and/or one or more evidence objects to change relationships with data processes, controls, data analysis projects, or evidence tasks according to changes in control scopes.

FIG. 6 illustrates a plurality of data objects corresponding to a data analysis project, a control, and an evidence task. For example, FIG. 6 illustrates a project object 600 corresponding to a data analysis project, a control object 602 corresponding to a control, and an evidence object 604 corresponding to an evidence task. Additionally, as illustrated, each data object includes a plurality of attribute values based on relevant attributes for each of the different types of data objects.

In one or more embodiments, the project object 600 includes data that the control management system 102 or another system utilizes to perform a data analysis project in connection with one or more data processes and/or one or more controls. For instance, for a data analysis project including an audit project, the project object 600 includes information that the control management system 102 utilizes to audit digital data and the use of such digital data within a computing environment. Additionally, the project object 600 includes information that the control management system 102 utilizes to determine one or more other data objects accessed in connection with performing the data analysis project.

To illustrate, the project object 600 includes a project identifier 606 that uniquely identifies the project object 600 (e.g., a universally unique identifier). Additionally, the project object 600 can include a project type 608 that identifies a project type of the data analysis project, such as a readiness project, audit project, etc. The project object 600 can include a description 610a with text that provides a user-facing description of the data analysis project. FIG. 6 illustrates that the project object 600 includes a status 612a indicating whether the data analysis project is active, completed, or inactive (e.g., not yet started) for one or more data processes. Furthermore, the project object 600 includes an owner 614a indicating a user account identifier authorized to modify one or more attributes of the project object 600.

Additionally, as illustrated, the project object 600 includes a control association 616a including an array of one or more values corresponding to one or more control objects with which the project object 600 is associated. For instance, the control association 616a includes a plurality of array elements that each include an identifier of a corresponding control object associated with the project object 600. To illustrate, the control association 616a includes at least one entry with a control identifier 620 from the control object 602. The control association 616a may include a plurality of entries with a plurality of control identifiers for a plurality of control objects.

Furthermore, in one or more embodiments, the project object 600 includes an evidence association 618a including an array of one or more values corresponding to one or more evidence objects with which the project object 600 is associated. For instance, the evidence association 618a includes a plurality of array elements that each include an identifier of a corresponding evidence object associated with the project object 600. To illustrate, the evidence association 618a includes at least one entry with an evidence identifier 628 from the evidence object 604. The evidence association 618a may include a plurality of entries with a plurality of evidence identifiers for a plurality of evidence objects.

As mentioned, in one or more embodiments, the control object 602 includes a control identifier 620 that uniquely identifies the control object 602. Furthermore, the control object 602 can include a master control identifier 622 that identifies a type of master identity shared by all control objects that fall under the same master (e.g., having the same control title), which the control management system 102 can utilize to identify duplicate controls. In some embodiments, the control object 602 includes a control title for use with the master control identifier 622. Additionally, the control object 602 includes a description 610b including a user-facing description of the control and a status 612b that indicates whether the control is implemented or not implemented. The control object 602 also includes an owner 614b identifying an owner user account authorized to change the control object 602.

The control object 602 further includes a scope 624a that identifies a hierarchical level associated with the control object 602 indicating one or more data processes to which the corresponding control applies. For example, the scope 624a includes an indication of a specific hierarchy level (e.g., process-specific, organization-wide) and/or one or more specific data processes to which the control applies. In some embodiments, the scope 624a indicates a plurality of different hierarchy levels (e.g., groups of data processes) to which the control applies.

The control object 602 can also include a project association 626 including an array of one or more values corresponding to one or more project objects with which the control object 602 is associated. Specifically, the project association 626 includes one or more array elements identifying corresponding project objects, such as the project object 600. The control object 602 may be associated with a plurality of project objects indicating that one or more data analysis projects may be active, completed, or planned for a data process associated with the control object 602.

The control object 602 also includes an evidence association 618b including an array of one or more values corresponding to one or more evidence objects with which the control object 602 is associated. For instance, the evidence association 618b includes a plurality of array elements that each include an identifier of a corresponding evidence object associated with the control object 602, such as the evidence object 604. The evidence association 618b may include any number of entries with any number of evidence identifiers for applicable evidence objects.

In one or more embodiments, the evidence object 604 includes an evidence identifier 628 that uniquely identifies the evidence object 604. The evidence object 604 can also include a master identifier 630 indicating a type of evidence task associated with the evidence object 604 (e.g., an identifier shared by evidence objects corresponding to a "Data Protection Officer" type of evidence task). The evidence object 604 can also include an evidence title for use with the master identifier 630. The evidence object 604 can include a description 610c describing evidence to be collected for the evidence task (e.g., "Provide a digital file of an organization chart showing the position of the Data Protection Officer along with the name.").

Additionally, the evidence object 604 can include guidance 632 indicating how to find the relevant evidence (e.g., "Identify an individual in the organization responsible for data privacy."). The evidence object 604 can also include an owner 614c indicating a user account authorized to make changes to attributes of the evidence object 604. The evidence object 604 can further include a scope 624b indicating a hierarchical level to which the evidence task associated with the evidence object 604 applies. In some embodiments, the evidence object 604 has the same scope as a corresponding control object (e.g., the control object 602).

The evidence object 604 can also include a control association 616b including an array of one or more values corresponding to one or more control objects with which the evidence object 604 is associated. For instance, the control association 616*b* includes a plurality of array elements that each include an identifier of a corresponding control object associated with the evidence object 604 (e.g., the control identifier 620 of the control object 602). The control association 616*b* may include a plurality of entries with a plurality of control identifiers for a plurality of control objects.

In some embodiments, as illustrated, the evidence object 604 includes evidence data 634 including evidence collected for the evidence object 604. In particular, the evidence data 634 includes attachments (e.g., digital files) that the control management system 102 identified in connection with collecting evidence for an evidence task associated with the evidence object 604. The evidence data 634 can include, for each piece of evidence, an array element including an identifier for a piece of evidence, a date of collection of the evidence, and a method of collection (e.g., uploaded by a user account or collected by integration with a computing application). In some embodiments, the control management system 102 or another system utilizes the evidence data 634 in connection with data analysis projects, such as for audit projects. In additional embodiments, the evidence data 634 (or another attribute value of the evidence object 604) includes an identifier of an integration used to collect evidence for the evidence object 604, such that an empty value indicates that no integrations have been installed/activated for the evidence object 604.

In one or more embodiments, the control management system 102 utilizes project objects, control objects, and/or evidence objects in connection with changing a control scope of a control. For example, in response to a request to change a scope of a control from a lower hierarchical level to a higher hierarchical level, the control management system 102 searches for all duplicate control objects associated with the control. In particular, the control management system 102 determines that a control object is a duplicate if the control object and a target control object have the same master control identifiers and the scope of the control object is the same or lower than the scope of the target control object. To illustrate, if the target control object with master control identifier "J86753" is being converted to an organization-wide scope, all control objects with the master control identifier "J86753" and having a process-specific scope for the entity are duplicate control objects.

Additionally, in connection with changing the control scope of the control, the control management system 102 can search for project objects that prevent merging control objects. For example, the control management system 102 identifies project objects indicated in the project association for the control object. The control management system 102 can determine whether corresponding project objects have project types (e.g., audit) and statuses (e.g., active) that prevent modification of the control objects. Although some project types may prevent control scope changes, other project types may not prevent control scope changes. In response to determining that a project object prevents a control scope change, the control management system 102 can delay or prevent the control scope change and generate a notification.

In response to determining that no project objects prevent the change, the control management system 102 merges the control objects to remove duplicate control objects. Specifically, the control management system 102 updates a control-project association by appending project association data from a duplicate control object to the target control object. Additionally, for each project object in the project association data, the control management system 102 updates the control association data of the project object to replace references to the duplicate control object with references to the target control object. Furthermore, the control management system 102 updates control-evidence associations by appending evidence association data from the duplicate control object to the target control object. For each evidence object identified in the evidence association data, the control management system 102 updates the control association data of the evidence object to replace references to the duplicate control object with the target control object. The control management system 102 deletes/deactivates the duplicate control object(s).

To merge duplicate evidence objects into a combined evidence object in connection with a control scope change (or other request to merge evidence objects), the control management system 102 searches for duplicate evidence objects based on the master identifiers in the evidence objects. Specifically, the control management system 102 identifies a master identifier of a target evidence object and finds all evidence objects that are identified in a target control object's evidence association data and have the same master identifier. Furthermore, as described above with respect to merging control objects, the control management system 102 identifies project objects that prevent merging of evidence objects based on the project types and statuses of project objects associated with the evidence objects.

In one or more embodiments, the control management system 102 generates a combined evidence object by generating a new evidence object or selecting an existing (e.g., duplicate) evidence object as the combined object. Additionally, the control management system 102 sets the scope of the evidence object based on the scope of the target control object. The control management system 102 can append, for each duplicate evidence object, control associations data, evidence data, and integration data from the duplicate evidence object to the combined evidence object. The control management system 102 can also delete or deactivate the duplicate evidence object(s).

As mentioned, in some embodiments, the control management system 102 clones evidence objects. For example, the control management system 102 initiates the cloning process in response to a request to clone an evidence object or in connection with changing a control scope of a corresponding control. In particular, the control management system 102 generates a cloned evidence object from a selected evidence object and modifies one or more attribute values of the cloned evidence object. To illustrate, the control management system 102 determines specific attribute values that do not copy over from the selected evidence object (or are removed/replaced after cloning). More specifically, the control management system 102 modifies a title, an owner, evidence data, and integration data of the cloned evidence object while retaining a description, guidance, and control association data.

In one or more embodiments, the control management system 102 populates a scope of the cloned evidence object including a default value (e.g., from the selected evidence object) or a selected value based on user input. For instance, the control management system 102 utilizes the default value in response to determining that cloned evidence objects are assigned to different owners that collectively assist with collecting evidence. Accordingly, the control management system 102 automatically replicate attachments added to a cloned evidence object to other cloned evidence objects having the same scope and associated with the same control object. Thus, the control management system 102 can provide cloning of evidence objects in separate collection actions while still applying the same controls and evidence data across each of the evidence objects.

Alternatively, the control management system 102 populates a scope of a cloned evidence object based on user input in response to cloning an evidence object with a higher hierarchy level (e.g., organization-wide) and the cloned evidence object is changed to a lower hierarchy level (e.g., process-specific), or vice-versa. In such embodiments, the control management system 102 determines that evidence data added to a cloned evidence object having a specific scope value is not added to a cloned evidence object having a different scope value. Accordingly, even if cloned evidence objects are associated with the same control object, the control management system 102 does not copy evidence data in response to determining that the scopes are different.

In additional embodiments, the control management system 102 also populates various tags of each cloned evidence object. In particular, the control management system 102 copies tags from a selected evidence object to a target evidence object (e.g., indicating descriptive tags applied to an evidence task for filtering purposes). The control management system 102 can also append a "clone" tag to the tags of the cloned evidence object, which allows the control management system 102 to filter for (or otherwise distinguish) cloned evidence objects from an original evidence object.

According to one or more embodiments, the control management system 102 clones control objects in connection with lowering a hierarchy level of a control. To illustrate, in response to modifying a hierarchy level from an organization-wide scope to a process-specific scope, the control management system 102 clones a control object associated with the control. For example, the control management system 102 sets the scope of a target control object (e.g., a selected control object) to the new, lower hierarchy level. The control management system 102 can also delete an owner from the target control object, and in some instances, generate a prompt to select a new owner.

In additional embodiments, the control management system 102 updates the scope of each evidence object associated with the target control object to the new hierarchy level. For instance, the control management system 102 accesses each evidence object indicated in the evidence association data of the target control object. The control management system 102 modifies the scope of the identified evidence objects to the new hierarchy level to match the scope of the target control object.

In one or more embodiments, the control management system 102 optionally removes project-control associations from the target control object. In particular, the control management system 102 can access project objects identified in the project association data of the target control object. For each identified project object, the control management system 102 can update the control association data to remove references to the target control object. The control management system 102 can also delete the project association data from the target control object.

According to at least some embodiments, the control management system 102 determines whether more than one logical unit exists at the selected hierarchical level for the selected scope (e.g., multiple products under a single entity). The control management system 102 can create, for each additional logical unit, a cloned control object that is a copy of the target control object. For each cloned control object, the control management system 102 clones evidence objects identified in the evidence association data of the cloned control object. Additionally, the control management system 102 can update a cloned control object's evidence association data to refer to each cloned evidence object rather than the original evidence object used to obtain the cloned evidence object.

In one or more embodiments, the control management system 102 updates attribute values of the cloned evidence objects. For example, the control management system 102 updates the scope of each cloned evidence object to match the scope of the cloned control object. Additionally, the control management system 102 replaces the owner with a new owner (e.g., in response to a user input indicating a new user account). The control management system 102 can also provide a prompt to keep the evidence data from the original evidence object or delete the evidence data. Furthermore, the control management system 102 can provide a prompt to keep integrations data for evidence collection or to delete the integrations data. The control management system 102 also replaces references to the target control object with references to the corresponding cloned control object in the control association data.

As mentioned, in one or more embodiments, the control management system 102 utilizes data objects to change control scopes of controls in accordance with user input and/or automatically via one or more integrated computing applications. For example, the control management system 102 can utilize compliance initiatives to identify compliance gaps for implementing controls in accordance with system requirements frameworks. As part of the compliance initiatives, the control management system 102 can automatically implement changes at one or more computing systems according to changes in control scopes of controls, frameworks, or hardware/software configurations. For example, the control management system 102 integrates with computing systems to obtain, generate, and modify data objects associated with various data processes.

Additionally, the control management system 102 can have permissions to implement one or more modifications to computing systems based on a compliance initiative. To illustrate, the computing systems can grant permissions to the control management system 102 to make changes to files at the computing systems according to the compliance initiative. As an example, the computing systems can grant permissions to the control management system 102 to modify an encryption associated with a dataset in accordance with a system requirements framework and a corresponding control. The computing systems can also grant permissions to the control management system 102 to purge a database after a specific time period in accordance with a system requirements framework. Furthermore, the computing systems can automatically retrieve and evaluate a data authorization list as part of a routinely executed script or program in accordance with a system requirements framework. The control management system 102 can further obtain permissions from the computing systems to update control implementations in response to changes in the control scopes for the controls.

Figure 7:
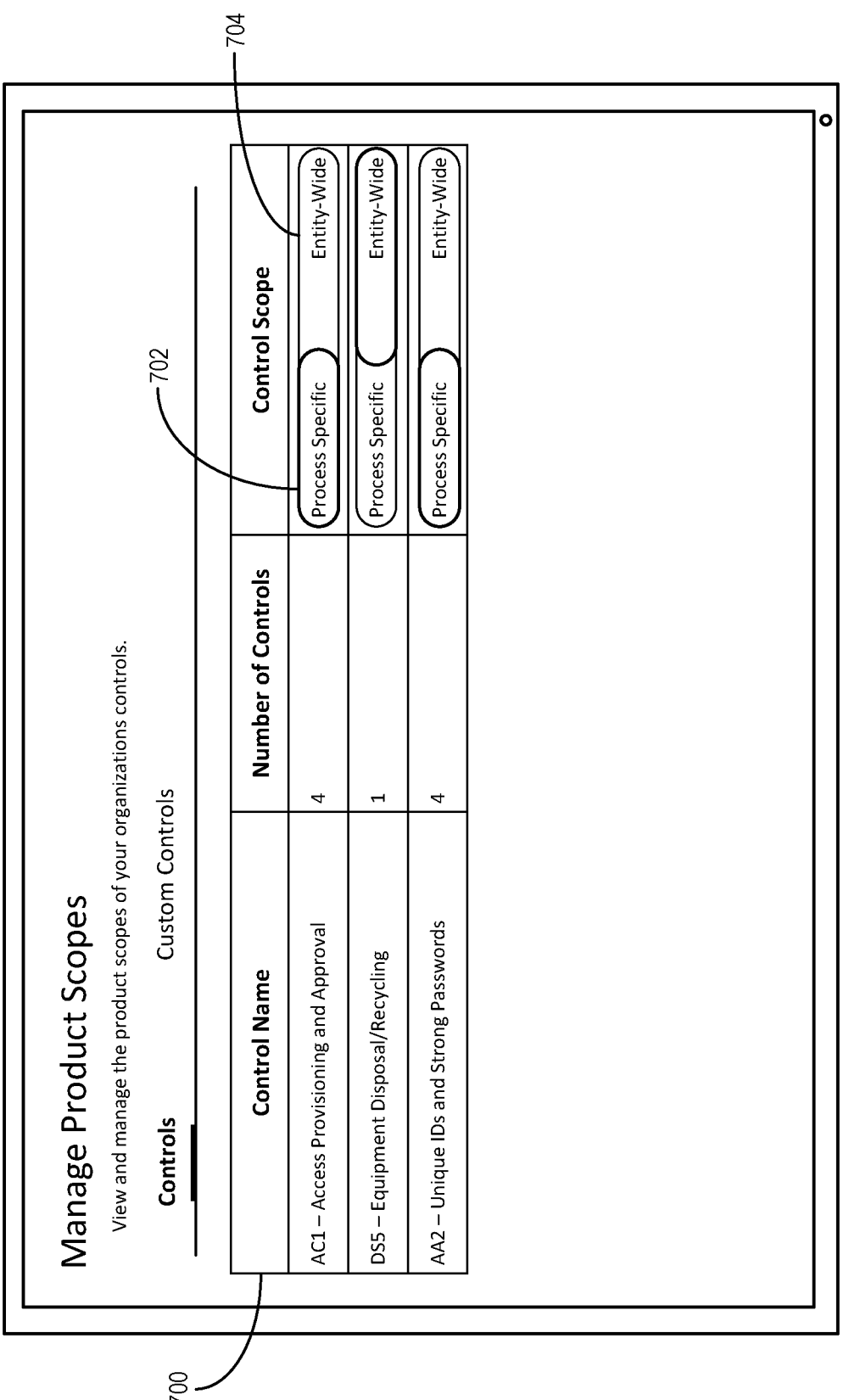
FIGS. 7-13 illustrate examples of graphical user interfaces for viewing controls and changing control scopes of the controls for data processes via data objects in accordance with one or more embodiments.

FIGS. 7-13 illustrate examples of graphical user interfaces of a client application on a client device for modifying a control scope of a control in connection with one or more data processes of an entity. In particular, as illustrated in FIG. 7, the control management system 102 provides, for display via a graphical user interface, a list 700 of controls available for managing for an entity in connection with one or more data processes. For example, the client device displays the list 700 of controls with a name of a particular control, a number of controls (e.g., instances of the control associated with one or more data processes), and a control scope.

To illustrate, the client device displays that several controls have a first scope element 702 selected, indicating that the scope of the corresponding control is a "process specific" hierarchy level. Accordingly, the indicated controls are implemented for a specific set of data processes at a lower hierarchy level. Alternatively, as illustrated in FIG. 7, a control may have a second scope element 704 selected, indicating that the scope of the corresponding control is an "entity-wide" hierarchy level. The corresponding control is thus implemented for all data processes associated with the entity. Interacting with the graphical user interface to select a scope element can also cause the control management system 102 to initiate a process to change the control scope for the corresponding control.

Figure 8:
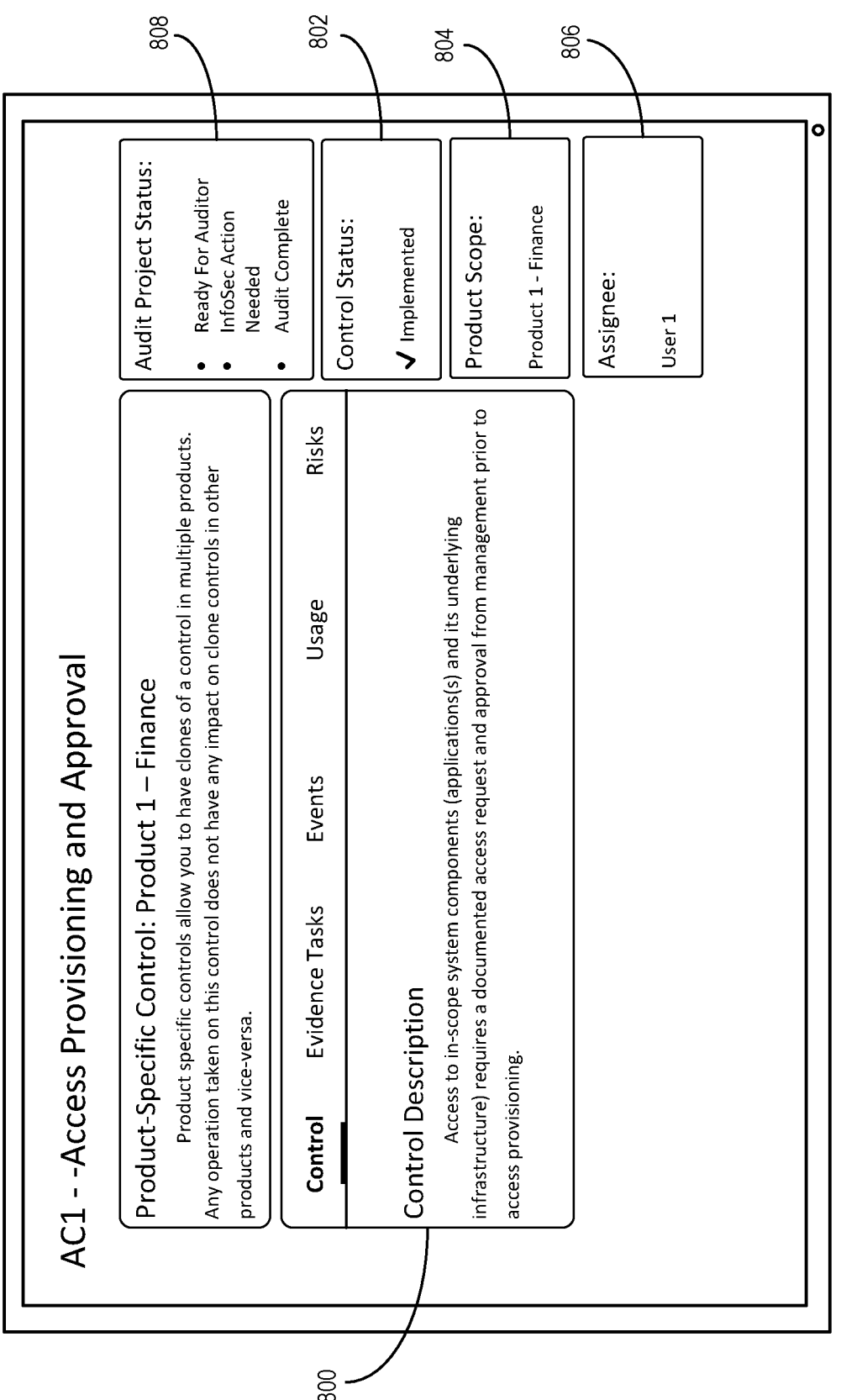

FIG. 8 illustrates a graphical user interface of a client device displaying details associated with a selected control. In particular, as illustrated, the client device displays a control description 800 including a text, user-facing description of the control. For example, the control description 800 may include a summary of requirements for handling specific data or for methods of performing one or more data processes associated with the entity. To illustrate, as shown, the control description can indicate that the control requires, for a specific data process, that access to computing applications and computing infrastructure requires a documented access request (e.g., in a digital file) and approval prior to access provisioning.

The client device can also display additional information associated with the control. Specifically, the client device of FIG. 8 displays various attribute values from a control object corresponding to the control. For instance, the client device displays a control status 802 indicating whether the control has been implemented for one or more data processes. The client device also displays a scope 804 indicating a hierarchy level associated with the control (e.g., process-specific hierarchy level) and, if applicable, one or more data processes associated with the control. In one or more embodiments, the client device also displays an assignee 806 (e.g., an owner) indicating a user or a user account authorized to make changes to the control.

As illustrated in FIG. 8, the client device also displays a project status 808 for one or more data analysis projects associated with the control. Specifically, the control management system 102 or another system may initiate one or more audit projects, readiness projects, etc., in connection with the control to determine whether the control is implemented correctly, whether the corresponding data processes are handling specific data types according to the control requirements, etc. For example, the project status 808 can indicate whether one or more data analysis projects are active, inactive, or ongoing. The project status 808 can also indicate current steps or operations corresponding to data analysis projects that are ongoing.

Figure 9:
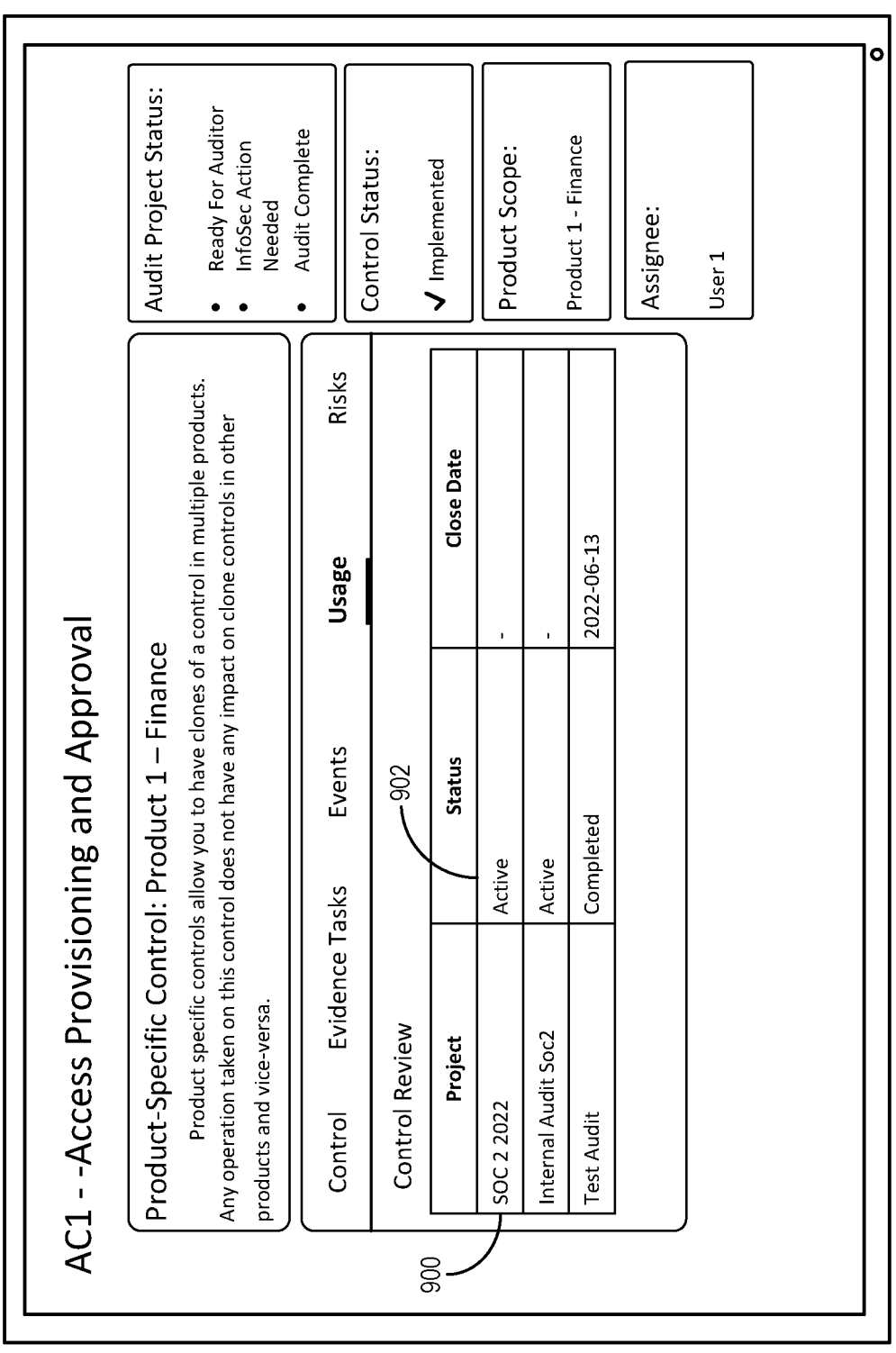

In one or more embodiments, the client device also provides options to view additional information associated with a particular control. For example, the client device can provide options for viewing evidence data associated with the control or usage of the control in connection with one or more data processes or data analysis projects. FIG. 9 illustrates an example of a graphical user interface of a client device for displaying usage of a control in connection with a plurality of data analysis projects. To illustrate, the client device displays a list 900 of data analysis projects associated with a control. For example, the control management system

102 can determine project association data from a control object for the control and access project objects identified in the project association data. The client device can display data associated with the data analysis projects based on attribute values of the corresponding project objects, such as a project status 902 for a data analysis project.

Figure 10:
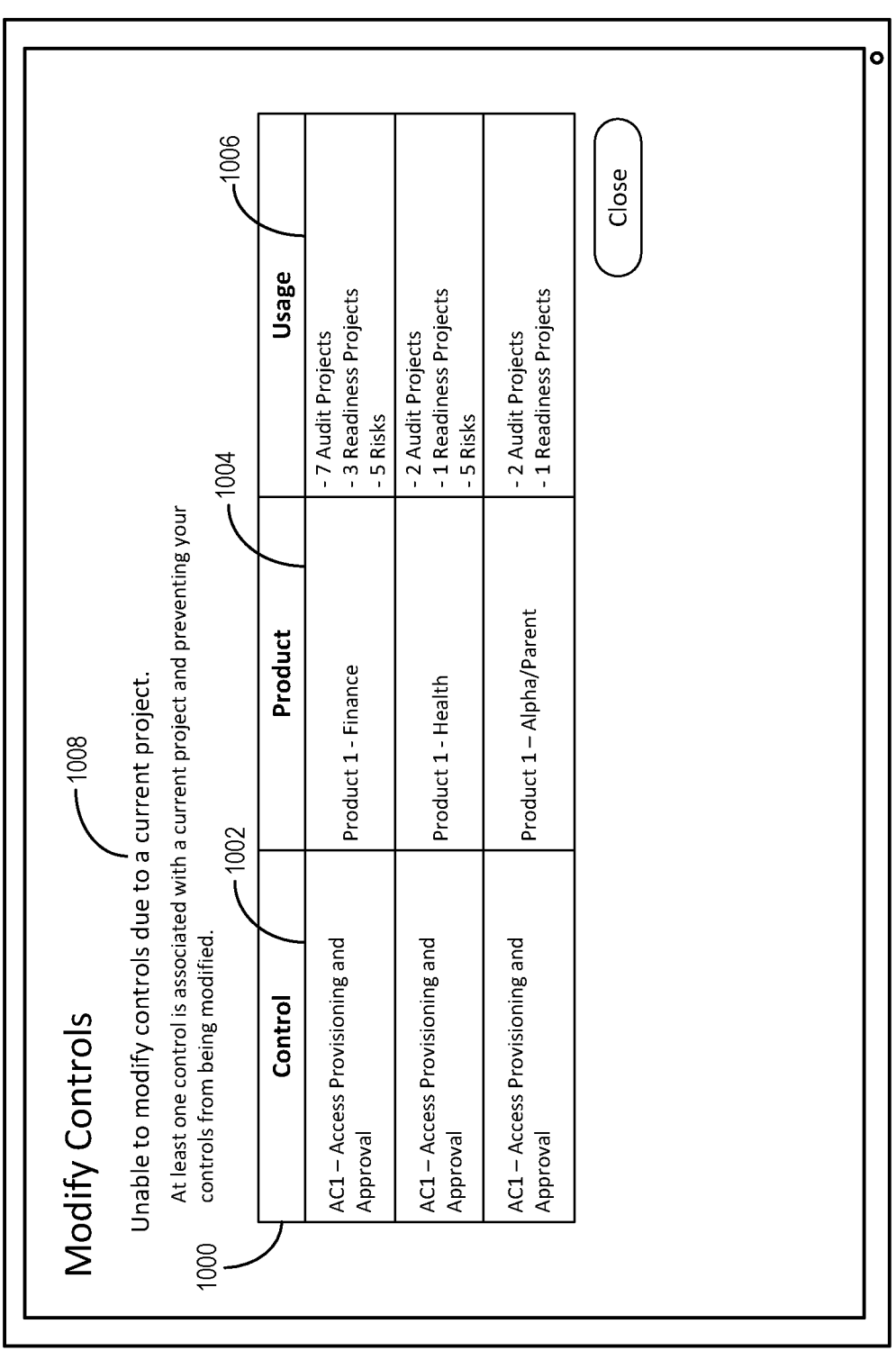

According to one or more embodiments, the control management system 102 also provides tools for modifying control scopes of controls in connection with one or more data processes. FIG. 10 illustrates an example of a graphical user interface of a client device for modifying a control scope of one or more controls. For example, as illustrated, the client device displays a list 1000 of controls implemented in connection with one or more data processes. Specifically, the list 1000 of controls includes, for a particular control, a title 1002 including a control title from a corresponding control object, a scope 1004 including one or more data processes to which the control applies, and control usage 1006 indicating statuses of one or more data analysis projects corresponding to the control.

As illustrated, a first control includes a process-specific scope (e.g., a specific product) and is associated with a plurality of data analysis projects that are active for the control. For instance, the control is associated with a plurality of audit projects, readiness projects, and risk analysis projects. In one or more embodiments, as mentioned, certain types of data analysis projects can prevent the control management system 102 from changing a control scope of a control. Accordingly, the control management system 102 can determine that the audit projects that are active for the first control prevent the control management system 102 from modifying the control scope of the first control. The client device can display a notification 1008 indicating that the control management system 102 is unable to modify the controls due to the active data analysis project(s).

Figure 11:
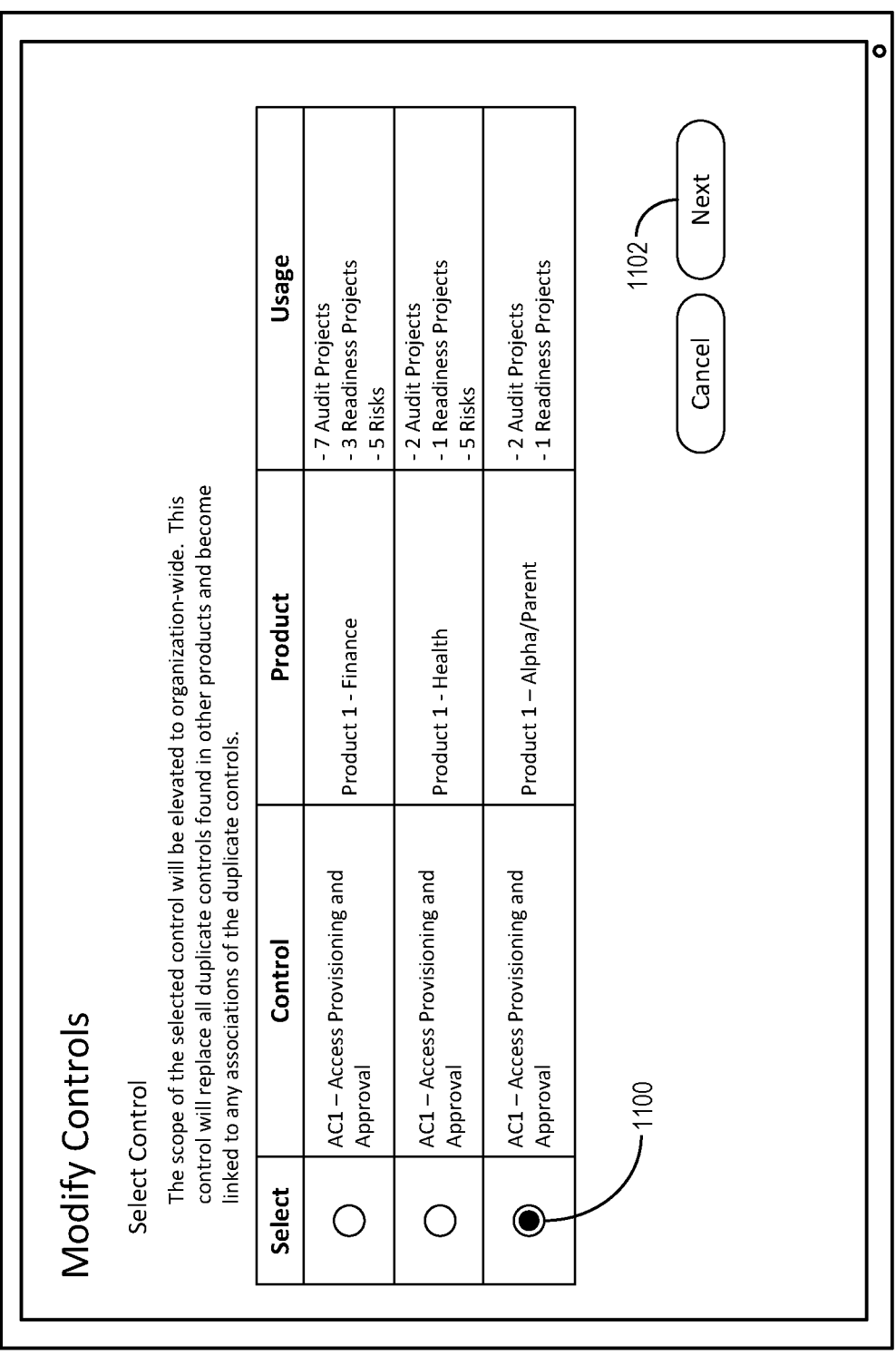

In response to determining that there are no active data analysis projects preventing modification of a control, the control management system 102 can initiate a process to change a control scope of the control. FIG. 11 illustrates an example of a graphical user interface of a client device for modifying a control scope of a control. Specifically, the client device displays a selected element 1100 indicating a selection of a specific control. As shown, the selected control is not associated with active data analysis projects that prevent the control scope from changing for the selected control. More specifically, although the selected control is associated with one or more active data analysis projects, the active data analysis projects do not correspond to one or more project types that prevent modification of the selected control.

Additionally, the client device displays an option 1102 to advance changing the control scope of the selected control. For instance, in response to a selection of the option 1102 to initiate the control scope change for the selected control, the control management system 102 identifies the selected control and any data objects associated with the selected control. In particular, the control management system 102 can identify one or more control objects, one or more evidence objects, and/or one or more project objects affected by a control scope change for the selected control.

Figure 12:
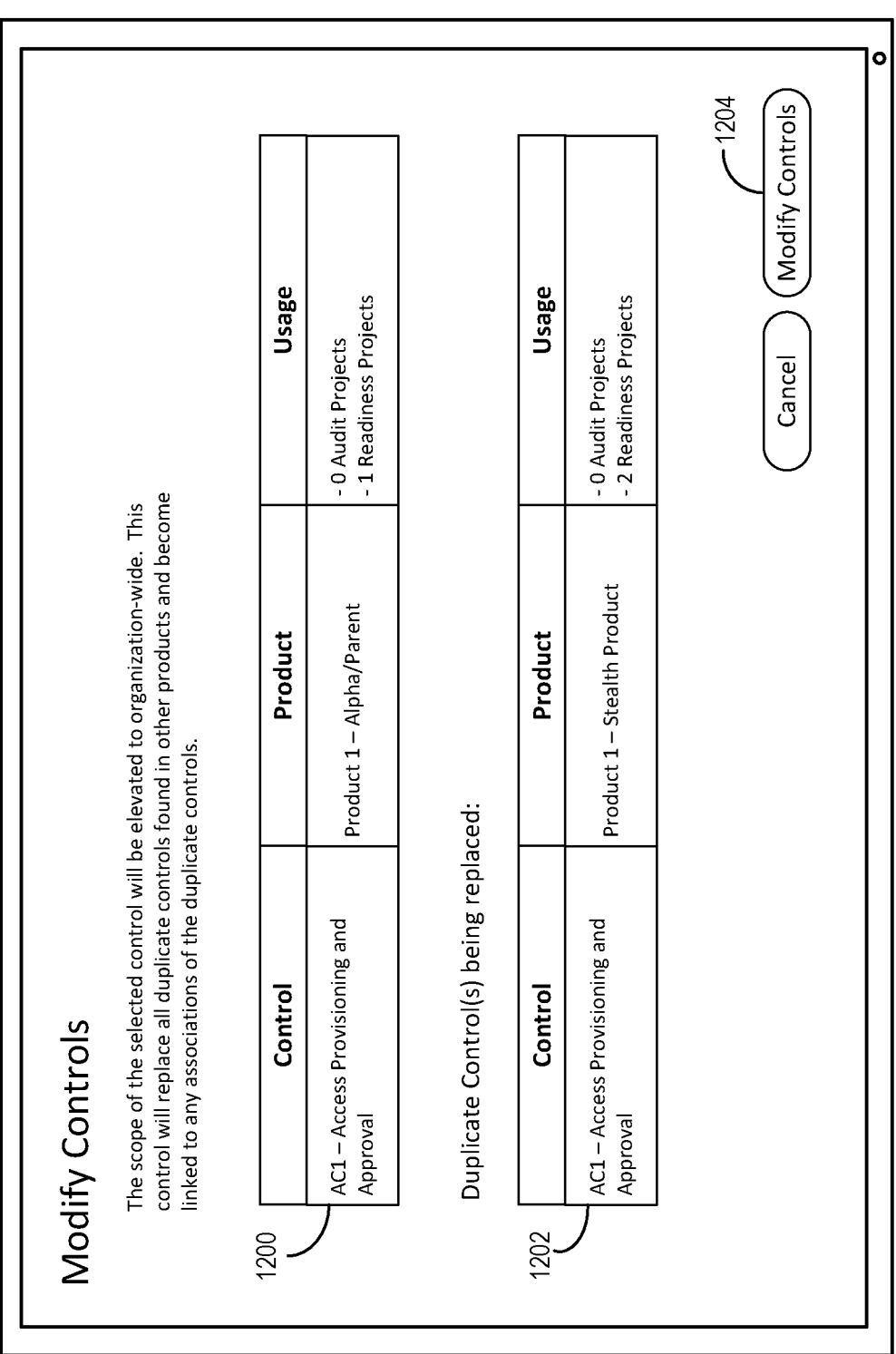

For example, in connection with modifying a control scope change of a control, the control management system 102 can identify one or more data objects to merge or clone according to the control scope change. FIG. 12 illustrates an example of a graphical user interface of a client device for displaying changes to controls in response to changing a control scope of a particular control. To illustrate, the control management system 102 utilizes the attribute values of identified data objects to determine one or more duplicate controls to be replaced (e.g., merged) based on the control scope change. Alternatively, the control management system 102 utilizes the attribute values of the identified data objects to determine one or more controls to be cloned based on the control scope change.

As illustrated in FIG. 12, the client device displays, within the graphical user interface, a plurality of elements indicating controls affected by a control scope change of the selected control. In one or more embodiments, the client device displays the selected control 1200 and details associated with the selected control. Additionally, the client device also displays a duplicate control 1202 that the control management system 102 merges with the selected control in response to changing the scope of the selected control 1200 (e.g., from a process-specific hierarchy level to an organization-wide hierarchy level). The client device also displays an option 1204 to complete the process to modify the control scope of the selected control 1200 and replace the duplicate control 1202.

Figure 13:
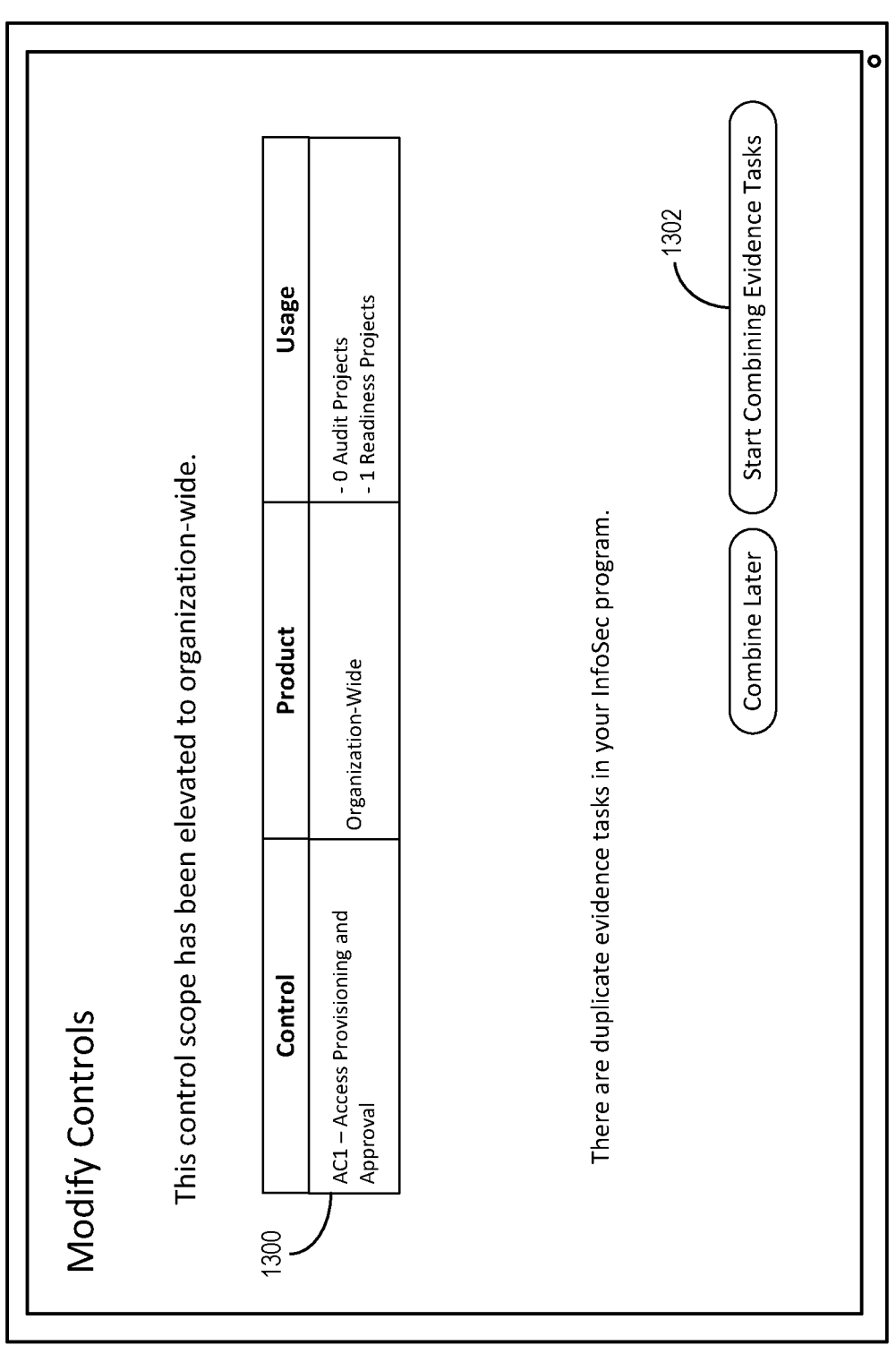

FIG. 13 illustrates an example of a client device displaying results of a process to modify a control scope of a control. In particular, as illustrated, the client device displays a modified control 1300 including the modified control scope. For example, in response to changing the control scope of the control from a process-specific hierarchy level to an organization-wide hierarchy level, the client device displays the modified control 1300 with the organization-wide hierarchy level according to modified attribute levels of a corresponding control object. Furthermore, the control management system 102 has removed the duplicated controls (e.g., illustrated in FIG. 12) by removing the corresponding control objects. In some embodiments, the client device also displays an option 1302 to initiate a process for modifying one or more evidence objects associated with the modified control 1300.

Figure 15:
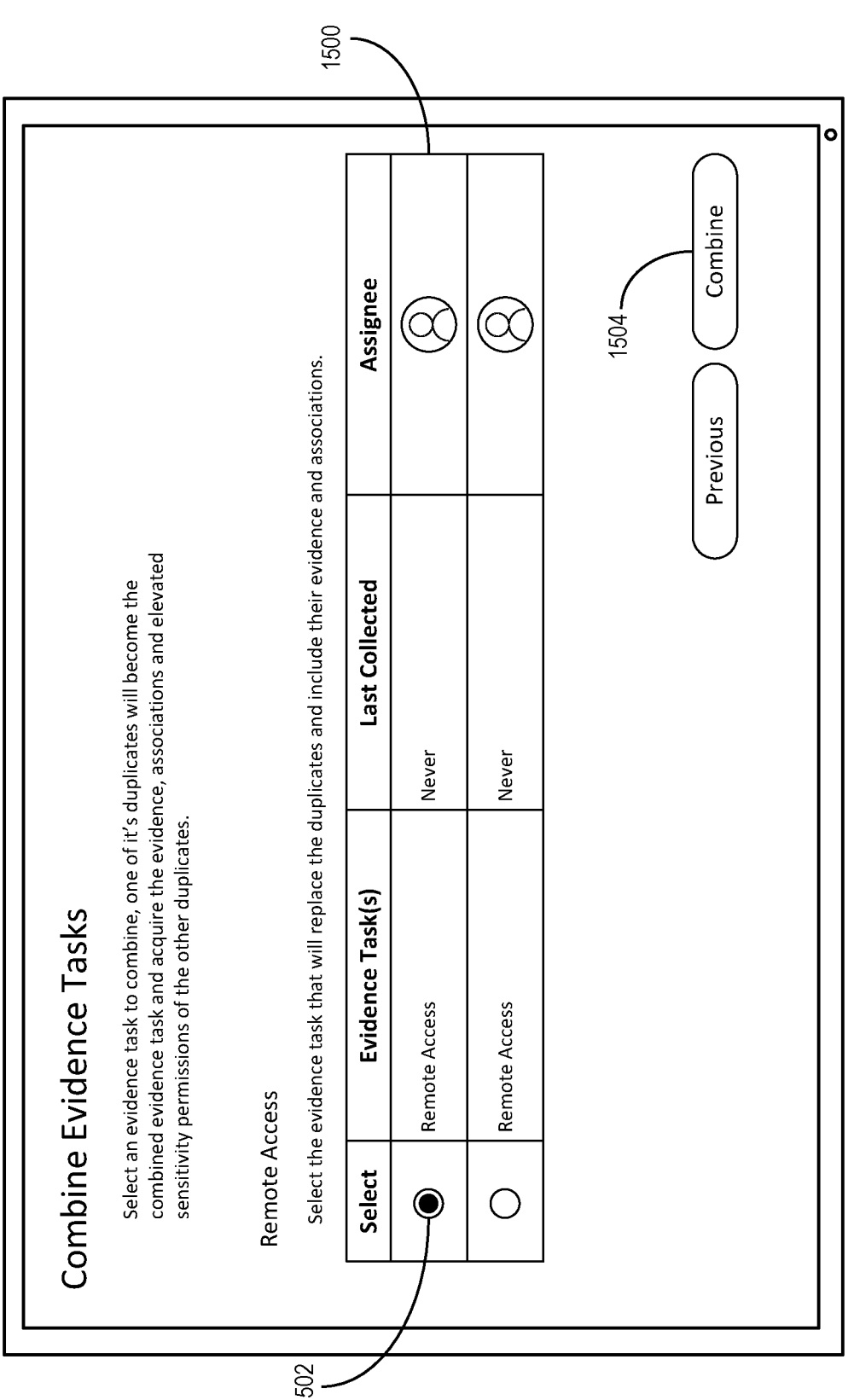
Figure 16:
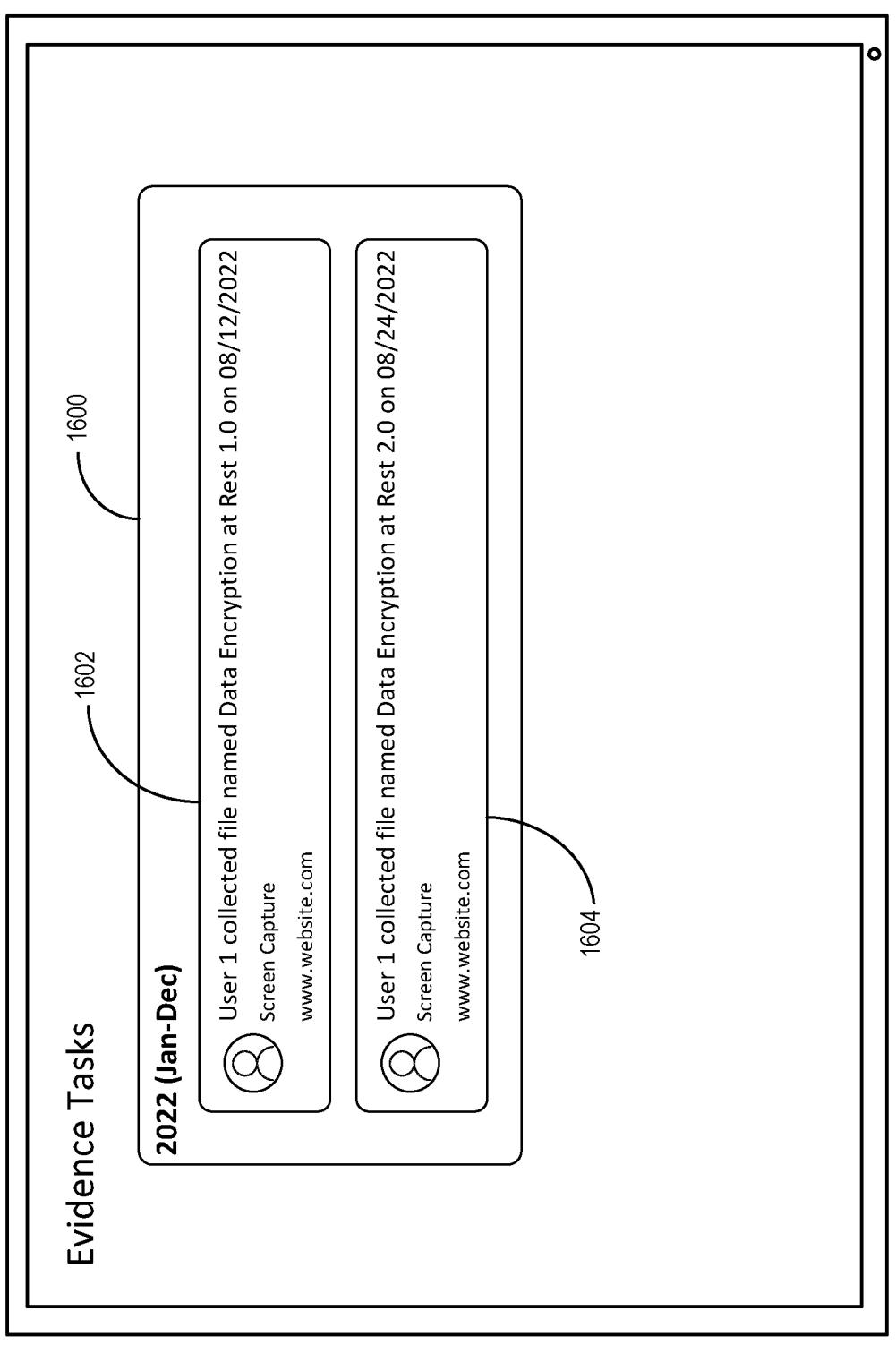

According to one or more embodiments, as mentioned, the control management system 102 modifies one or more evidence objects based on a control scope change to a control. Specifically, the control management system 102 merges evidence objects in response to merging evidence objects. FIGS. 14-16 illustrate examples of graphical user interfaces of client devices for merging evidence objects representing various evidence tasks in connection with merging control objects representing a plurality of controls.

For example, FIG. 14 illustrates an example of a graphical user interface of a client device in response to initiating a process for combining evidence tasks (e.g., via corresponding evidence objects). To illustrate, the client device displays an evidence task 1400 corresponding to a plurality of different controls including a control for which the control management system 102 modified a control scope. In addition, the client device displays a selected element 1402 indicating a selection of the evidence task 1400 for combining a plurality of evidence tasks. In some embodiments, the client device also displays an option 1404 for continuing the process of combining the evidence objects associated with the evidence with the evidence task 1400 and one or more duplicate evidence tasks.

FIG. 15 illustrates an example of a client device displaying a graphical user interface for merging evidence tasks. In particular, the client device displays a plurality of evidence tasks associated with various controls based on a selection of an evidence task in FIG. 14. For example, the client device displays a first evidence task 1500 with additional information such as, but not limited to, a title of the evidence task (e.g., "Remote Access"), a timestamp for the most recent collection of evidence data for the first evidence task 1500, and an assignee (e.g., owner) authorized to make changes to the first evidence task 1500. Additionally, FIG. 15 illustrates the client device illustrating a selected element 1502 selecting the first evidence task 1500 for determining how to combine evidence objects. The client device also displays an option 1504 to proceed with combining evidence tasks based on the selected evidence task.

In one or more embodiments, the control management system 102 combines a plurality of evidence objects corresponding to a selected evidence task as described previously. For example, the control management system 102 determines attribute values for including in a combined evidence object. Additionally, the control management system 102 can determine whether to combine evidence data associated with the combined evidence object by obtaining evidence data (e.g., by downloading digital files) corresponding to each of the separate evidence objects merged to generate the combined evidence object.

FIG. 16 illustrates an example of a client device displaying combined evidence data 1600 according to a combined evidence object. Specifically, the combined evidence data 1600 includes first evidence data 1602 corresponding to a first evidence object and second evidence data 1604 corresponding to a second evidence object. By combining a plurality of evidence objects and evidence data into a combined evidence object, the control management system 102 retains collected evidence data from a plurality of separate controls for use in providing evidence for a combined control. Additionally, combining the evidence tasks (e.g., by merging separate evidence objects into a combined evidence object) allows the control management system 102 to consolidate information associated with separate evidence tasks within a graphical user interface.

In one or more embodiments, the control management system 102 provides tools for viewing details associated with individual evidence tasks. For example, the control management system 102 accesses evidence objects to obtain and display, via a graphical user interface of a client device, information associated with a plurality of evidence tasks. FIG. 17 illustrates a client device displaying a graphical user interface for displaying a plurality of evidence tasks associated with various controls of an entity. In particular, the client device displays a list 1700 of evidence tasks including a summary of details associated with the evidence tasks. To illustrate, the list 1700 of evidence tasks includes titles of the evidence tasks, scopes of the evidence tasks (e.g., based on the corresponding controls), controls associated with the various evidence tasks, assignees of the evidence tasks, collection intervals for the evidence tasks, and dates of most recent collection of evidence according to the evidence tasks.

In one or more embodiments, an evidence task may be associated with more than one control. For example, separate instances of a control may utilize the same evidence task to independently collect evidence in connection with a plurality of separate data processes (or groups of data processes). Accordingly, in some embodiments, the control management system 102 manages a plurality of evidence objects associated with various controls according to control association data of the evidence objects and corresponding control objects. By leveraging separate evidence objects and data objects, the control management system 102 can ensure that evidence tasks and corresponding controls are implemented accurately and efficiently for various data processes.

In one or more additional embodiments, the control management system 102 also provides options for cloning evidence objects representing separate evidence tasks in connection with one or more controls. For instance, the control management system 102 can clone evidence objects for utilizing different instances of a single evidence task in connection with different data processes for which a control has been implemented. To illustrate, as previously mentioned, the control management system 102 can detect a request (e.g., based on a user request or automatically based on changes to data objects) to clone an evidence object associated with a data process for use with one or more additional data processes.

Figure 18:
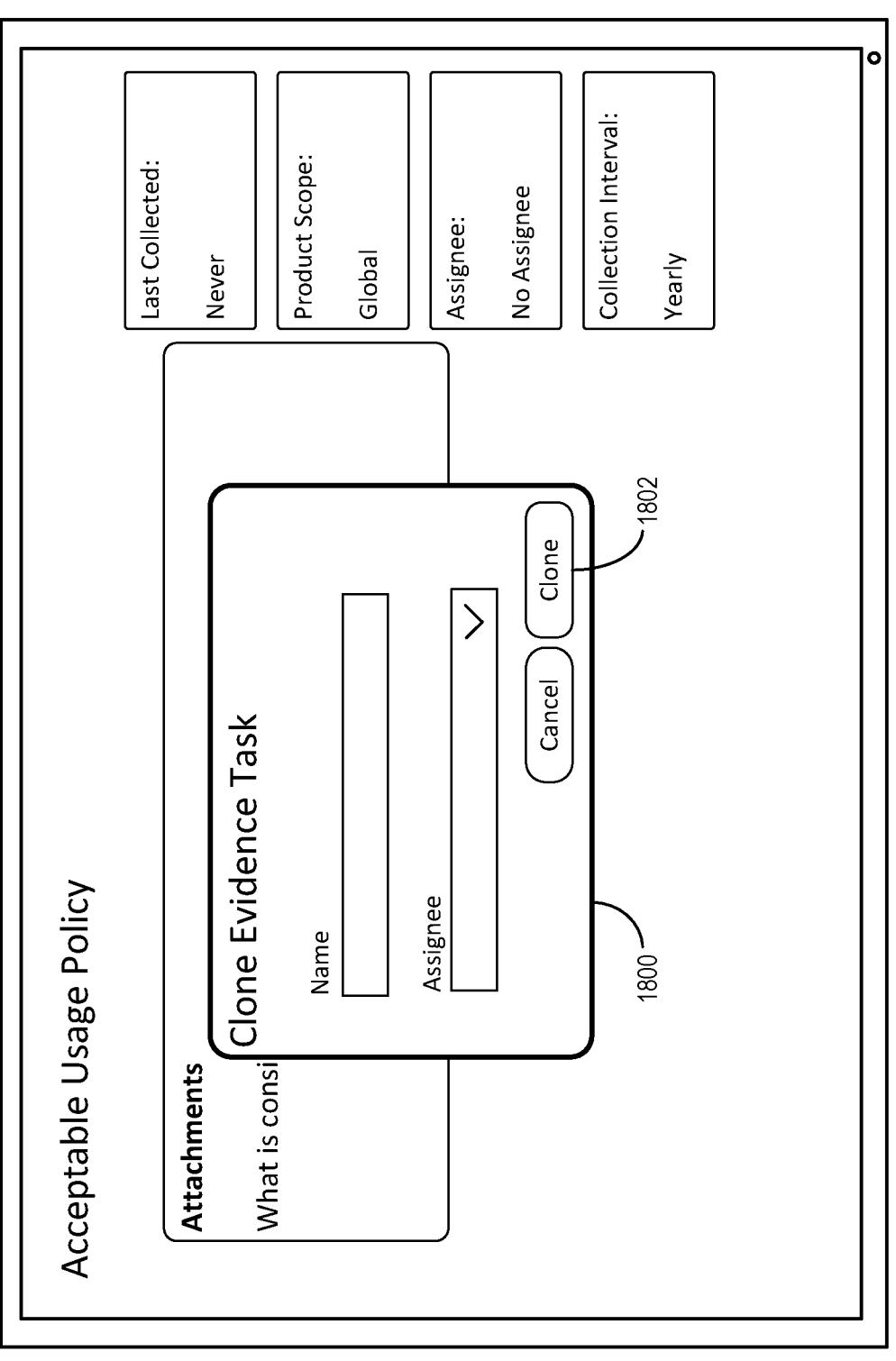
FIG. 18 illustrates an example of a graphical user interface for cloning an evidence task for one or more controls via data objects in accordance with one or more embodiments.

FIG. 18 illustrates that a client device displays a graphical user interface for cloning an evidence task (e.g., by cloning one or more evidence objects). Specifically, the client device displays an interface for viewing details associated with a particular evidence task. Additionally, the client device displays an overlay 1800 for cloning the evidence task for use with one or more additional data processes. For example, the client device can display the overlay 1800 with an option to name a cloned evidence task and to set an assignee (e.g., owner) for the cloned evidence task. Furthermore, the client device can display an option 1802 to clone the selected evidence task with the indicated name and assignee information by generating a cloned evidence object with attribute values according to the indicated name and assignee information. Additionally, the control management system 102 generates the cloned evidence object based on at least a portion of the evidence object corresponding to the selected evidence task.

As described above, the control management system 102 can provide tools for generating, modifying, and otherwise managing data objects for various controls, evidence tasks, data analysis projects, and/or data processes. In particular, the control management system 102 can provide tools for merging, cloning, removing, or changing data objects in accordance with modifying a control scope of a control. Additionally, the control management system 102 can provide tools for managing evidence tasks to collect evidence data stored at one or more digital data repositories according to implementations of various controls and/or for various data processes. The control management system 102 thus provides efficient and flexible customization of digital data management for an entity via a plurality of interactive interfaces that can access and modify data in data objects via integrations with a plurality of computing applications and computing systems.

Turning now to FIG. 19, this figure shows a flowchart of a process 1900 of modifying a control scope of a control for one or more data processes via a plurality of data objects corresponding to controls and evidence tasks. While FIG. 19 illustrates acts according to one embodiment, alternative embodiments may omit, add to, reorder, and/or modify any of the acts shown in FIG. 19. The acts of FIG. 19 can be performed as part of a method. Alternatively, a non-transitory computer readable medium can comprise instructions, that when executed by one or more processors, cause a computing device to perform the acts of FIG. 19. In still further embodiments, a system can perform the acts of FIG. 19.

As shown, the process 1900 includes an act 1902 of determining data objects corresponding to controls and evidence tasks for a plurality of data processes. Additionally, the process 1900 includes an act 1904 of detecting a change to a control scope of a control for a data process. The process 1900 also includes an act 1906 of modifying control objects and evidence objects in response to the change to the control scope. The process 1900 further includes an act 1908 of generating an indication of the change to the control scope for display via a graphical user interface.

In one or more embodiments, the process 1900 includes determining, by accessing a digital data repository, a plurality of data objects comprising control objects corresponding to controls and evidence objects corresponding to evidence tasks for a plurality of data processes associated with an entity. The process 1900 can also include detecting a change to a control scope of a control for at least one data process of the plurality of data processes associated with the entity. The process 1900 can further include modifying one or more control objects and one or more evidence objects associated with one or more data processes of the plurality of data processes in response to the change to the control scope of the control. Additionally, the process 1900 can include generating, for display via a graphical user interface of a computing device associated with the entity, an indication of the change to the control scope according to the one or more control objects or the one or more evidence objects modified in response to the change to the control scope.

The process 1900 can also include detecting the change to the control scope of the control by detecting a change to a hierarchy level of the control from a first hierarchy level in a data process hierarchy associated with the plurality of data processes to a second hierarchy level in the data process hierarchy. The process 1900 can further include detecting the change to the hierarchy level of the control by determining that the second hierarchy level is above the first hierarchy level in the data process hierarchy. Additionally, the process 1900 can include modifying the one or more control objects and the one or more evidence objects by: merging one or more duplicate control objects into a combined control object according to the second hierarchy level; and merging one or more duplicate evidence objects into a combined evidence object according to the second hierarchy level.

In some embodiments, the process 1900 includes detecting the change to the hierarchy level of the control by determining that the second hierarchy level is below the first hierarchy level in the data process hierarchy. The process 1900 can include modifying the one or more control objects and the one or more evidence objects by modifying a mapping within the one or more control objects and the one or more evidence objects to remove one or more data processes of the at least one data process according to the second hierarchy level.

The process 1900 can also include modifying the one or more control objects and the one or more evidence objects by determining, by accessing the digital data repository, one or more status values of one or more data analysis projects corresponding to the one or more data processes. The process 1900 can also include modifying the one or more control objects and the one or more evidence objects in response to determining that the one or more status values indicate that the one or more data analysis projects corresponding to the one or more data processes are inactive.

The process 1900 can further include modifying the one or more control objects and the one or more evidence objects by preventing modification of the one or more control objects and the one or more evidence objects in response to the one or more status values of the one or more data analysis projects indicating that the one or more data analysis projects are active. The process 1900 can include monitoring the one or more status values to detect a change in the one or more status values of the one or more data analysis projects to indicate that the one or more data analysis projects are inactive. Additionally, the process 1900 can include modifying the one or more control objects and the one or more evidence objects in response to detecting the change in the one or more status values of the one or more data analysis projects.

The process 1900 can include determining the plurality of data objects comprises integrating a data extraction software application with the digital data repository and a third-party system via an application programming interface associated with the plurality of data objects or the plurality of data processes. The process 1900 can also include modifying, utilizing the data extraction software application in response to the change to the control scope, the one or more control objects and the one or more evidence objects associated with the one or more data processes by changing one or more attribute values of the one or more control objects and the one or more evidence objects.

In one or more embodiments, the process 1900 includes modifying the one or more control objects and the one or more evidence objects by determining that the control scope of the control changes to include one or more additional data processes of the plurality of data processes. The process 1900 can include modifying one or more additional control objects associated with the one or more additional data processes to include a mapping to the control. Additionally, the process 1900 can include generating, in connection with the control, one or more cloned evidence objects for the one or more additional data processes based on an evidence object associated with the at least one data process.

The process 1900 can also include detecting the change to the control scope of the control by detecting an interaction with a graphical user interface element corresponding to the control scope of the control. The process can further include generating the indication of the change to the control scope by toggling a visual status of the graphical user interface element indicating the change to the control scope.

In one or more embodiments, the process 1900 includes determining, by accessing a digital data repository, a plurality of data objects comprising control objects corresponding to controls and evidence objects corresponding to evidence tasks for a plurality of data processes associated with an entity. The process 1900 can include detecting a change to a control scope of a control for at least one data process of the plurality of data processes associated with the entity from a first hierarchy level in a data process hierarchy to a second hierarchy level. The process 1900 can also include determining one or more control objects and one or more evidence objects associated with one or more data processes based on the second hierarchy level. Additionally, the process 1900 can include modifying the one or more control objects and one or more evidence objects associated with the one or more data processes in response to the change to the control scope of the control. Furthermore, the process 1900 can include generating, for display via a graphical user interface of a computing device associated with the entity, an indication of the change to the control scope according to the one or more control objects or the one or more evidence objects modified in response to the change to the control scope.

In one or more embodiments, the process 1900 includes determining the one or more control objects and the one or more evidence objects by determining that the second hierarchy level corresponds to a set of data processes including the at least one data process. The process 1900 can include modifying the one or more control objects and the one or more evidence objects by merging control objects associated with the set of data processes into a combined control object and evidence objects associated with the set of data processes into a combined evidence object.

Additionally, the process 1900 can include determining the one or more control objects and the one or more evidence objects by determining that the second hierarchy level corresponds to a subset of data processes of the first hierarchy level. The process 1900 can also include modifying the one or more control objects and the one or more evidence objects by updating one or more hierarchy values and one or more owner values for one or more control objects and one or more evidence objects associated with the subset of data processes to the second hierarchy level.

The process 1900 can include determining one or more project objects associated with one or more data analysis projects according to the subset of data processes of the second hierarchy level. The process can further include modifying one or more control values of the one or more project objects to remove one or more references to the control from the one or more project objects.

Additionally, the process 1900 can include generating the indication of the change to the control scope by generating a plurality of electronic messages comprising indications of changes to owner values of a plurality of data process objects of sets of data processes associated with the first hierarchy level and the second hierarchy level. Furthermore, the process 1900 can include providing the plurality of electronic messages for display via graphical user interfaces of a plurality of computing devices associated with owners associated with the sets of data processes.

The process 1900 can include determining that the one or more control objects and the one or more evidence objects correspond to a particular data process involved in a data analysis project that is active. The process 1900 can also include preventing modification of the one or more control objects and the one or more evidence objects while the data analysis project is active. The process 1900 can further include generating, for display via the graphical user interface of the computing device associated with the entity, an electronic message indicating that the change to the control scope is on hold while the data analysis project is active.

The process 1900 can include determining the one or more control objects and one or more evidence objects by determining that the second hierarchy level is associated with an additional data process. Additionally, the process 1900 can include generating, utilizing a control object associated with the at least one data process, a cloned control object for the additional data process.

In some embodiments, the process 1900 includes determining, in connection with the change to the control scope of the control, a request to clone an evidence object associated with the at least one data process for an additional data process. The process 1900 can also include generating, utilizing the evidence object associated with the at least one data process, a cloned evidence object for the additional data process.

According to one or more embodiments, the process 1900 includes detecting a change to a control scope of a control for at least one data process of a plurality of data processes associated with an entity from a first hierarchy level in a data process hierarchy to a second hierarchy level. The process 1900 can also include determining, by accessing a digital data repository comprising a plurality of data objects corresponding to the plurality of data processes associated with the entity, one or more control objects and one or more evidence objects associated with one or more data processes based on the second hierarchy level. The process 1900 can further include modifying the one or more control objects and one or more evidence objects associated with the one or more data processes in response to the change to the control scope of the control. Additionally, the process 1900 can include generating, for display via a graphical user interface of a computing device associated with the entity, an indication of the change to the control scope according to the one or more control objects or the one or more evidence objects modified in response to the change to the control scope.

The process 1900 can include detecting the change to the control scope of the control by determining a subset of data processes associated with the first hierarchy level that is not associated with the second hierarchy level. The process 1900 can also include determining the one or more control objects and the one or more evidence objects by determining a set of control objects and a set of evidence objects associated with the subset of data processes. The process 1900 can include modifying the one or more control objects and the one or more evidence objects by removing references to the control from the set of control objects and the set of evidence objects associated with the subset of data processes.

Additionally, the process 1900 can include detecting the change to the control scope of the control by determining a set of additional data processes associated with the second hierarchy level that is not associated with the first hierarchy level. The process 1900 can also include determining the one or more control objects and the one or more evidence objects by determining a set of control objects and a set of evidence objects associated with the set of additional data processes. The process 1900 can further include modifying the one or more control objects and the one or more evidence objects by merging the set of control objects into a combined control object and the set of evidence objects into a combined evidence object in connection with the second hierarchy level.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCS, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 20:
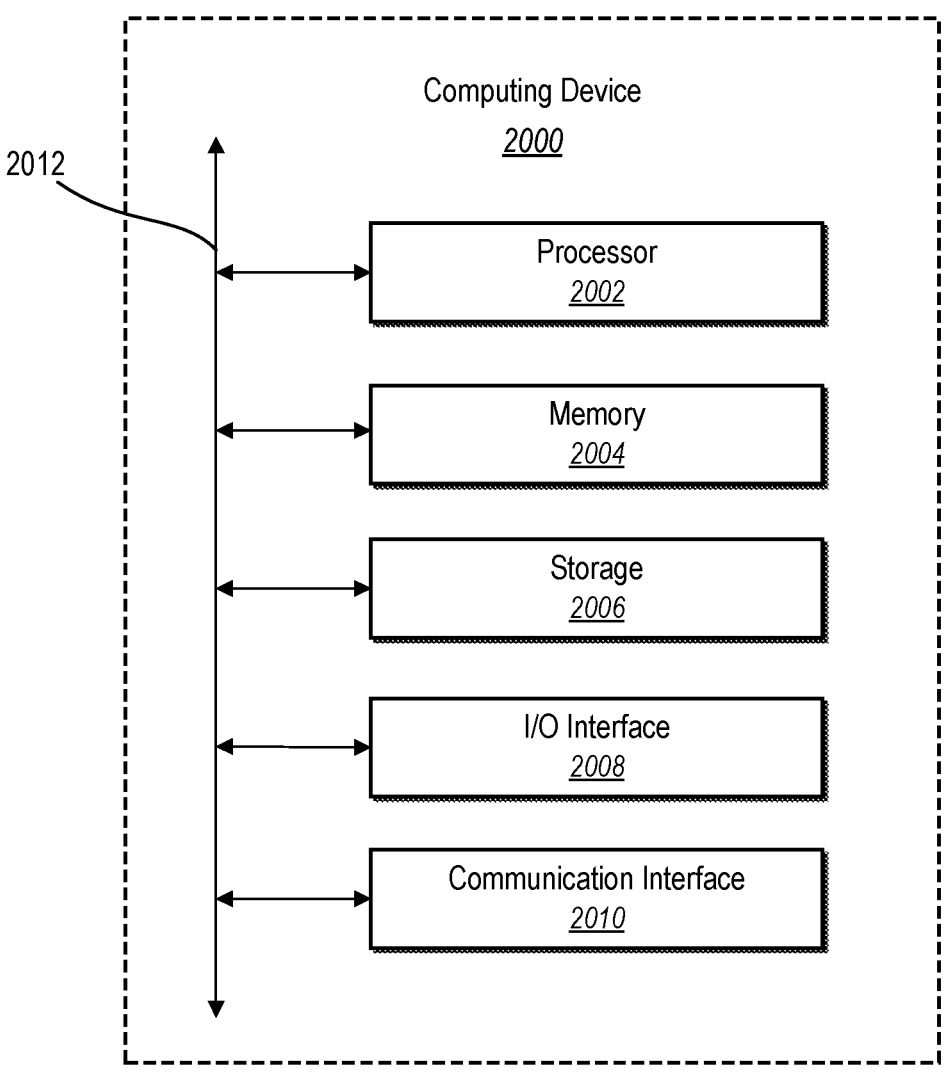
FIG. 20 illustrates an example of a computing device in accordance with one or more embodiments.

FIG. 20 illustrates a block diagram of exemplary computing device 2000 that may be configured to perform one or more of the processes described above. One will appreciate that one or more computing devices such as the computing device 2000 may implement the system(s) of FIG. 1. As shown by FIG. 20, the computing device 2000 can comprise a processor 2002, a memory 2004, a storage device 2006, an I/O interface 2008, and a communication interface 2010, which may be communicatively coupled by way of a communication infrastructure 2012. In certain embodiments, the computing device 2000 can include fewer or more components than those shown in FIG. 20. Components of the computing device 2000 shown in FIG. 20 will now be described in additional detail.

In one or more embodiments, the processor 2002 includes hardware for executing instructions, such as those making up a computer program. As an example, and not by way of limitation, to execute instructions for dynamically modifying workflows, the processor 2002 may retrieve (or fetch) the instructions from an internal register, an internal cache, the memory 2004, or the storage device 2006 and decode and execute them. The memory 2004 may be a volatile or non-volatile memory used for storing data, metadata, and programs for execution by the processor(s). The storage device 2006 includes storage, such as a hard disk, flash disk drive, or other digital storage device, for storing data or instructions for performing the methods described herein.

The I/O interface 2008 allows a user to provide input to, receive output from, and otherwise transfer data to and receive data from computing device 2000. The I/O interface 2008 may include a mouse, a keypad or a keyboard, a touch screen, a camera, an optical scanner, network interface, modem, other known I/O devices or a combination of such I/O interfaces. The I/O interface 2008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 2008 is configured to provide graphical data to a display for presentation to a user. The graphical data may be representative of one or more graphical user interfaces and/or any other graphical content as may serve a particular implementation.

The communication interface 2010 can include hardware, software, or both. In any event, the communication interface 2010 can provide one or more interfaces for communication (such as, for example, packet-based communication) between the computing device 2000 and one or more other computing devices or networks. As an example, and not by way of limitation, the communication interface 2010 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 2010 may facilitate communications with various types of wired or wireless networks. The communication interface 2010 may also facilitate communications using various communication protocols. The communication infrastructure 2012 may also include hardware, software, or both that couples components of the computing device 2000 to each other. For example, the communication interface 2010 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method comprising:

determining, by at least one computer processor accessing a digital data repository, a plurality of data objects comprising one or more control objects corresponding to controls and one or more evidence objects corresponding to evidence tasks for a plurality of data processes associated with an entity;

determining, by the at least one computer processor, that at least one of the one or more control objects and the one or more evidence objects corresponds to a particular data process of the plurality of data processes involved in a data analysis project that is active;

detecting, by the at least one computer processor, a change to a control scope of a control for at least one data process of the plurality of data processes associated with the entity;

preventing, by the at least one computer processor and while the data analysis project is active, modification of the one or more control objects and the one or more evidence objects;

generating, by the at least one computer processor for display via a graphical user interface of a computing device associated with the entity, an electronic message indicating that the change is on hold while the data analysis project is active;

modifying, by the at least one computer processor, the one or more control objects and the one or more evidence objects associated with one or more data processes of the plurality of data processes in response to the change to the control scope of the control; and generating, by the at least one computer processor for display via the graphical user interface, an indication of the change to the control scope according to the one or more control objects or the one or more evidence objects modified in response to the change to the control scope.

2. The method of claim 1, wherein detecting the change to the control scope of the control comprises detecting a change to a hierarchy level of the control from a first hierarchy level in a data process hierarchy associated with the plurality of data processes to a second hierarchy level in the data process hierarchy.

3. The method of claim 2, wherein:

detecting the change to the hierarchy level of the control comprises determining that the second hierarchy level is above the first hierarchy level in the data process hierarchy; and modifying the one or more control objects and the one or more evidence objects comprises:

merging one or more duplicate control objects into a combined control object according to the second hierarchy level; and merging one or more duplicate evidence objects into a combined evidence object according to the second hierarchy level.

4. The method of claim 2, wherein:

detecting the change to the hierarchy level of the control comprises determining that the second hierarchy level is below the first hierarchy level in the data process hierarchy; and modifying the one or more control objects and the one or more evidence objects comprises modifying a mapping within the one or more control objects and the one or more evidence objects to remove one or more data processes of the at least one data process according to the second hierarchy level.

5. The method of claim 1, wherein modifying the one or more control objects and the one or more evidence objects comprises:

determining, by accessing the digital data repository, one or more status values of one or more data analysis projects corresponding to the one or more data processes; and modifying the one or more control objects and the one or more evidence objects in response to determining that the one or more status values indicate that the one or more data analysis projects corresponding to the one or more data processes are inactive.

6. The method of claim 5, wherein modifying the one or more control objects and the one or more evidence objects comprises:

monitoring the one or more status values to detect a change in the one or more status values of the one or more data analysis projects to indicate that the one or more data analysis projects are inactive; and modifying the one or more control objects and the one or more evidence objects in response to detecting the change in the one or more status values of the one or more data analysis projects.

7. The method of claim 1, wherein:

determining the plurality of data objects comprises integrating a data extraction software application with the digital data repository and a third-party system via an application programming interface associated with the plurality of data objects or the plurality of data processes; and modifying, utilizing the data extraction software application in response to the change to the control scope, the one or more control objects and the one or more evidence objects associated with the one or more data processes by changing one or more attribute values of the one or more control objects and the one or more evidence objects.

8. The method of claim 1, wherein modifying the one or more control objects and the one or more evidence objects comprises:

determining that the control scope of the control changes to include one or more additional data processes of the plurality of data processes;

modifying one or more additional control objects associated with the one or more additional data processes to include a mapping to the control; and generating, in connection with the control, one or more cloned evidence objects for the one or more additional data processes based on an evidence object associated with the at least one data process.

9. The method of claim 1, wherein:

detecting the change to the control scope of the control comprises detecting an interaction with a graphical user interface element corresponding to the control scope of the control; and generating the indication of the change to the control scope comprises toggling a visual status of the graphical user interface element indicating the change to the control scope.

10. A system comprising:

one or more non-transitory computer readable media comprising a digital data repository; and at least one computer processor configured to cause the system to:

determine, by accessing the digital data repository, a plurality of data objects comprising one or more control objects corresponding to controls and one or more evidence objects corresponding to evidence tasks for a plurality of data processes associated with an entity;

determine that at least one of the one or more control objects and the one or more evidence objects corresponds to a particular data process of the plurality of data processes involved in a data analysis project that is active;

detect a change to a control scope of a control for at least one data process of the plurality of data processes associated with the entity from a first hierarchy level in a data process hierarchy to a second hierarchy level;

prevent, while the data analysis project is active, modification of the one or more control objects and the one or more evidence objects;

generate, for display via a graphical user interface of a computing device associated with the entity, an electronic message indicating that the change is on hold while the data analysis project is active;

determine the one or more control objects and the one or more evidence objects associated with one or more data processes based on the second hierarchy level;

modify the one or more control objects and the one or more evidence objects associated with the one or more data processes in response to the change to the control scope of the control; and generate, for display via the graphical user interface, an indication of the change to the control scope according to the one or more control objects or the one or more evidence objects modified in response to the change to the control scope.

11. The system of claim 10, wherein the at least one computer processor is further configured to cause the system to:

determine the one or more control objects and the one or more evidence objects by determining that the second hierarchy level corresponds to a set of data processes including the at least one data process; and modify the one or more control objects and the one or more evidence objects by merging the one or more control objects associated with the set of data processes into a combined control object and evidence objects associated with the set of data processes into a combined evidence object.

12. The system of claim 10, wherein the at least one computer processor is further configured to cause the system to:

determine the one or more control objects and the one or more evidence objects by determining that the second hierarchy level corresponds to a subset of data processes of the first hierarchy level; and modify the one or more control objects and the one or more evidence objects by updating one or more hierarchy values and one or more owner values for the one or more control objects and the one or more evidence objects associated with the subset of data processes to the second hierarchy level.

13. The system of claim 12, wherein the at least one computer processor is further configured to cause the system to:

determine one or more project objects associated with one or more data analysis projects according to the subset of data processes of the second hierarchy level; and modify one or more control values of the one or more project objects to remove one or more references to the control from the one or more project objects.

14. The system of claim 10, wherein the at least one computer processor is further configured to cause the system to generate the indication of the change to the control scope by:

generating a plurality of electronic messages comprising indications of changes to owner values of a plurality of data process objects of sets of data processes associated with the first hierarchy level and the second hierarchy level; and providing the plurality of electronic messages for display via graphical user interfaces of a plurality of computing devices associated with owners associated with the sets of data processes.

15. The system of claim 10, wherein the at least one computer processor is further configured to cause the system to:

determine the one or more control objects and the one or more evidence objects by determining that the second hierarchy level is associated with an additional data process; and generate, utilizing a control object associated with the at least one data process, a cloned control object for the additional data process.

16. The system of claim 10, wherein the at least one computer processor is further configured to cause the system to:

determine, in connection with the change to the control scope of the control, a request to clone an evidence object associated with the at least one data process for an additional data process; and generate, utilizing the evidence object associated with the at least one data process, a cloned evidence object for the additional data process.

17. A non-transitory computer readable medium comprising instructions that, when executed by at least one computer processor, cause the at least one computer processor to:

detect a change to a control scope of a control for at least one data process of a plurality of data processes associated with an entity from a first hierarchy level in a data process hierarchy to a second hierarchy level;

determine, by accessing a digital data repository comprising a plurality of data objects corresponding to the plurality of data processes associated with the entity, one or more control objects and one or more evidence objects associated with one or more data processes based on the second hierarchy level;

determine that at least one of the one or more control objects and the one or more evidence objects corresponds to a particular data process of the plurality of data processes involved in a data analysis project that is active;

prevent, while the data analysis project is active, modification of the one or more control objects and the one or more evidence objects;

generate, for display via a graphical user interface of a computing device associated with the entity, an electronic message indicating that the change is on hold while the data analysis project is active;

modify the one or more control objects and the one or more evidence objects associated with the one or more data processes in response to the change to the control scope of the control; and generate, for display via the graphical user interface, an indication of the change to the control scope according to the one or more control objects or the one or more evidence objects modified in response to the change to the control scope.

18. The non-transitory computer readable medium of claim 17, further comprising instructions that, when executed by the at least one computer processor, cause the at least one computer processor to:

detect the change to the control scope of the control by determining a subset of data processes associated with the first hierarchy level that is not associated with the second hierarchy level;

determine the one or more control objects and the one or more evidence objects by determining a set of control objects and a set of evidence objects associated with the subset of data processes; and modify the one or more control objects and the one or more evidence objects by removing references to the control from the set of control objects and the set of evidence objects associated with the subset of data processes.

19. The non-transitory computer readable medium of claim 18, further comprising instructions that, when executed by the at least one computer processor, cause the at least one computer processor to:

detect the change to the control scope of the control by determining a set of additional data processes associated with the second hierarchy level that is not associated with the first hierarchy level;

determine the one or more control objects and the one or more evidence objects by determining a set of control objects and a set of evidence objects associated with the set of additional data processes; and modify the one or more control objects and the one or more evidence objects by merging the set of control objects into a combined control object and the set of evidence objects into a combined evidence object in connection with the second hierarchy level.

20. The non-transitory computer readable medium of claim 17, wherein:

the instructions that detect the change to the control scope of the control further cause the at least one computer processor to detect an interaction with a graphical user interface element corresponding to the control scope of the control; and the instructions that generate the indication of the change to the control scope further cause the at least one computer processor to toggle a visual status of the graphical user interface element indicating the change to the control scope.

\* \* \* \* \*